US012625765B2

(12) United States Patent
Xue et al.

(10) Patent No.: US 12,625,765 B2
(45) Date of Patent: May 12, 2026

(54) DATA ENCODING METHOD FOR 3D NAND FLASH MEMORY

(71) Applicant: CITY UNIVERSITY OF HONG KONG, Kowloon (HK)

(72) Inventors: Chun Xue, Hung Hom (HK); Qiao Li, Xiamen (CN); Tei-Wei Kuo, Kowloon (HK); Min Ye, Shenzhen (CN); Shangyu Wu, Shenzhen (CN); Yufei Cui, Zhuhai (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 15 days.

(21) Appl. No.: 18/624,970

(22) Filed: Apr. 2, 2024

(65) Prior Publication Data

US 2025/0307073 A1      Oct. 2, 2025

(51) Int. Cl.
*G06F 11/10*      (2006.01)
*G06F 12/02*      (2006.01)

(52) U.S. Cl.
CPC ...... *G06F 11/1068* (2013.01); *G06F 12/0292* (2013.01)

(58) Field of Classification Search
None
See application file for complete search history.

(56) References Cited

U.S. PATENT DOCUMENTS 5,966,465 A * 10/1999 Keith ..................... H04N 19/15
375/E7.064

6,300,888 B1 * 10/2001 Chen ....................... H03M 7/46
704/503

(Continued)

FOREIGN PATENT DOCUMENTS

CN      114242136 A      3/2022
WO      2018004581 A1      1/2018

(Continued)

OTHER PUBLICATIONS

S. Dolev, S. Frenkel and M. Kopeetsky, "Entropy Adaptive On-Line Compression," 2014 IEEE 13th International Symposium on Network Computing and Applications, Cambridge, MA, USA, 2014, pp. 162-166, (Year: 2014).*

(Continued)

*Primary Examiner* — Daniel F. McMahon
(74) *Attorney, Agent, or Firm* — Merchant & Gould P.C.

(57)      ABSTRACT

A computer-implemented method for encoding data to be stored in a solid-state storage device. The method includes the steps of, providing a source data; calculating an entropy of the source data; applying a first encoding scheme to encode the source data into an encoded data, if the entropy is below a threshold; and applying a second data encoding scheme to encode the source data into the encoded data, if the entropy is equal to or higher than the threshold. The first encoding scheme is adapted to encode most frequently combined characters in the source data into predetermined characters to increase ratio of the predetermined characters in the encoded data. The second data encoding scheme is adapted to encode evenly distributed combined characters into a plurality of patterns with the predetermined characters, in order to increase the ratio of the predetermined characters in the encoded data.

16 Claims, 25 Drawing Sheets

(56) References Cited

U.S. PATENT DOCUMENTS

| | | | | |
|---|---|---|---|---|
| 6,535,642 | B1 * | 3/2003 | De Bonet | G06T 9/005 |
| | | | | 382/232 |
| 9,673,836 | B1 * | 6/2017 | Duale | H03M 7/4031 |
| 11,605,630 | B2 | 3/2023 | Or-Bach | |
| 11,625,191 | B2 | 4/2023 | Hazeghi | |
| 11,626,422 | B2 | 4/2023 | Yamazaki | |
| 11,636,325 | B2 | 4/2023 | Lung | |
| 11,646,309 | B2 | 5/2023 | Or-Bach | |
| 11,674,220 | B2 | 6/2023 | Ma | |
| 11,686,571 | B2 | 6/2023 | Kris | |
| 11,697,767 | B2 | 7/2023 | Bilodeau | |
| 11,714,709 | B2 | 8/2023 | Cadloni | |
| 11,716,847 | B2 | 8/2023 | Gao | |
| 11,729,960 | B2 | 8/2023 | Yamazaki | |
| 11,765,907 | B2 | 9/2023 | Kobayashi | |
| 2002/0172429 | A1 * | 11/2002 | Boliek | H04N 19/63 |
| | | | | 375/E7.064 |
| 2003/0074183 | A1 * | 4/2003 | Eisele | G06F 40/123 |
| | | | | 704/1 |
| 2023/0146353 | A1 | 5/2023 | Or-Bach | |
| 2023/0152702 | A1 | 5/2023 | Kobayashi | |
| 2023/0164988 | A1 | 5/2023 | Rabkin | |
| 2023/0164997 | A1 | 5/2023 | Rabkin | |
| 2023/0262996 | A1 | 8/2023 | Rosmeulen | |
| 2025/0167801 | A1 * | 5/2025 | Cooper | H03M 7/3059 |

FOREIGN PATENT DOCUMENTS

| | | | |
|---|---|---|---|
| WO | 2019179064 | A1 | 9/2019 |
| WO | 2020206822 | A1 | 10/2020 |
| WO | 2021223099 | A1 | 11/2021 |
| WO | 2022074221 | A1 | 4/2022 |

OTHER PUBLICATIONS

Jie Guo, Danghui Wang, Zili Shao, and Yiran Chen. Data-pattern-aware error prevention technique to improve system reliability. IEEE Transactions on Very Large Scale Integration (VLSI) Systems, 25(4):1433-1443, 2017.

Wonyoung Lee, Mincheol Kang, Seokin Hong, and Soontae Kim. Interpage-based endurance-enhancing lower state encoding for mlc and tlc flash memory storages. IEEE Transactions on Very Large Scale Integration (VLSI) Systems, 27(9):2033-2045, 2019.

Debao Wei, Liyan Qiao, Shiyuan Wang, and Xiyuan Peng. Fixation ratio of error location-aware strategy for increased reliable retention time of flash memory. IEEE Transactions on Very Large Scale Integration (VLSI) Systems, 24(10):3145-3155, 2016.

Wenhui Zhang, Qiang Cao, and Zhonghai Lu. Bit-flipping schemes upon mlc flash: Investigation, implementation, and evaluation. IEEE Transactions on Computer-Aided Design of Integrated Circuits and Systems, 38(4):780-784, 2018.

Yutong Zhao, Wei Tong, Jingning Liu, Dan Feng, and Hongwei Qin. Cesr: A cell state remapping strategy to reduce raw bit error rate of mlc nand flash. In MSST, pp. 161-171, 2019.

D. K.-H. Yu and J.-W. Hsieh, "Differential Evolution Algorithm With Asymmetric Coding for Solving the Reliability Problem of 3D-TLC CT Flash-Memory Storage Systems," in IEEE Transactions on Computer-Aided Design of Integrated Circuits and Systems, vol. 41, No. 9, pp. 2863-2876, Sep. 2022.

* cited by examiner

| Constant | 20 02 00 22 21 01 23 03 24 04 25 25 26 06 27 07 12 10 |
|---|---|
| Sorted characters | 34 51 47 12 36 45 56 32 44 61 04 51 56 74 21 23 72 46 |

| Constant | 2020 0202 0022 2200 2220 2002 0220 2000 2202 0200 |
|---|---|
| Sorted characters | 3451 4712 3645 5632 4461 0451 5674 2123 7246 5001 |

■ Rand ● Origin(Skewed) ▲ Skewed-2C ▼ Skewed-4C
◆ Origin(ReHuff) ◀ ReHuff-10 ▶ ReHuff-13

DATA ENCODING METHOD FOR 3D NAND FLASH MEMORY

BACKGROUND

This disclosure relates to the field of data storage and archiving, and in particular to encoding schemes for cold data storage.

3D NAND (Not-AND) flash memories are now prevailing in storage systems, including data centers and mobile devices, because of the high-performance and high-density characteristics [26, 34]. To reduce the cost per bit, 3D flash memories stack a great number of layers in a flash block and many cells in a horizontal word line for large capacities [12, 30]. The complex connection of flash cells in 3D flash blocks introduces new leakage paths of charges stored in flash cells, where the stored data suffer from high raw bit error rates (RBERs) [14, 20, 40]. RBER variations among pages and among layers raise further challenges for the reliability concerns in modern high-density 3D NAND flash memory [21, 25, 45].

A randomizer is unanimously applied in today's 3D NAND flash products to avoid extreme data patterns with extra-high RBERs. Through randomization, the original data is encoded into evenly distributed data over all voltage states, such as 8 voltage states in 3-bits-per-cell triple-level cell (TLC) flash. Data randomization is a simple but effective method to avoid programming lots of cells to voltage states that are prone to voltage shifting. Existing studies have presented that high voltage states tend to suffer from more voltage shifting [2, 11, 22]. This phenomenon has been well studied in planar flash memories, with different strategies proposed for reliability enhancement. For example, some conventional art observed that more than 90% bit errors occur due to the voltage shifting of the two high voltage states in planar 2-bits-per-cell multi-level cell (MLC) flash memories. Based on this observation, several approaches are proposed to reduce the RBER of flash memories, including flipping the data bits to generate more low voltage states [9, 10, 18, 36, 46], and eliminating one or several high voltage states [11, 35, 43]. The variations among voltage states also exist on 3D TLC NAND flash memories [22], and several studies adopt the same mapping principle to generate more low voltage states on 3D TLC flash memories [35, 42]. However, it is found that reducing high voltage states or increasing low voltage states does not work well on high-density 3DNAND flash memories.

The following references are referred to throughout this specification, as indicated by the numbered brackets:

[1] Yu Cai, Ning Chen, Yunxiang Wu, Erich F Haratsch, Earl T Cohen, and Timothy L Canepa. Method to distribute user data and error correction data over different page types by leveraging error rate variations, Feb. 16, 2016. U.S. Pat. No. 9,262,268.

[2] Yu Cai, Saugata Ghose, Erich F Haratsch, Yixin Luo, and Onur Mutlu. Error characterization, mitigation, and recovery in flash-memory-based solid-state drives. Proceedings of the IEEE, 105(9): 1666-1704, 2017.

[3] Yu Cai, Saugata Ghose, Yixin Luo, Ken Mai, Onur Mutlu, and Erich FHaratsch. Vulnerabilities in mlc nand flash memory programming: Experimental analysis, exploits, and mitigation techniques. In 2017 IEEE International Symposium on High Performance Computer Architecture (HPCA), pages 49-60, 2017.

[4] Yu Cai, Erich F Haratsch, Onur Mutlu, and Ken Mai. Error patterns in mlc nand flash memory: Measurement, characterization, and analysis. In 2012 Design, Automation & Test in Europe Conference & Exhibition (DATE), pages 521-526, 2012.

[5] Criteo Dataset. https://ailab.criteo.com/ressources/., 2014.

[6] Kaggle Datasets. Amazon reviews for sentiment analysis. https://www.kaggle.com/datasets/bittlingmayer/amazonreviews, 2017.

[7] Kaggle Datasets. Nips papers. https://www.kaggle.com/datasets/benhamner/nips-papers, 2017.

[8] Kaggle Datasets. Wikipedia sentences. https://www.kaggle.com/datasets/mikeortman/wikipedia-sentences, 2018.

[9] Masafumi Doi, Shuhei Tanakamaru, and Ken Takeuchi. A scaling scenario of asymmetric coding to reduce both data retention and program disturbance of nand flash memories. Solid-State Electronics, 92:63-69, 2014.

[10] Jie Guo, Danghui Wang, Zili Shao, and Yiran Chen. Data-pattern-aware error prevention technique to improve system reliability. IEEE Trans-actions on Very Large Scale Integration (VLSI) Systems, 25(4): 1433-1443, 2017.

[11] Jie Guo, Wujie Wen, Jingtong Hu, Danghui Wang, Hai Li, and Yiran Chen. Flex level: A novel nand flash storage system design for ldpc latency reduction. In 2015 52nd ACM/EDAC/IEEE Design Automation Conference (DAC), pages 1-6, 2015.

[12] Tsutomu Higuchi, Takuyo Kodama, Koji Kato, Ryo Fukuda, Naoya Tokiwa, Mitsuhiro Abe, Teruo Takagiwa, et al. 30.4 a 1tb 3b/cell 3d-flash memory in a 170+ word-line-layer technology. In Proceedings of the 68th IEEE International Solid-State Circuits Conference (ISSCC), volume 64, 2021.

[13] Duwon Hong, Myungsuk Kim, Geonhee Cho, Dusol Lee, and Jihong Kim. Guardederase: Extending ssd lifetimes by protecting weak word-lines. In 20th USENIX Conference on File and Storage Technologies (FAST 22), pages 133-146, 2022.

[14] Shehbaz Jaffer, Kaveh Mahdaviani, and Bianca Schroeder. Improving the reliability of next generation ssds using wom-v codes. In 20thUSENIX Conference on File and Storage Technologies (FAST 22), pages 117-132, 2022.

[15] Cheng Ji, Li-Pin Chang, Liang Shi, Congming Gao, Chao Wu, Yuan-gang Wang, and Chun Jason Xue. Lightweight data compression for mobile flash storage. ACM Transactions on Embedded Computing Systems (TECS), 16(5s): 1-18, 2017.

[16] Myoungsoo Jung, Jie Zhang, Ahmed Abulila, Miryeong Kwon, Narges Shahidi, John Shalf, Nam Sung Kim, and Mahmut Kandemir. Simplessd: Modeling solid state drives for holistic system simulation. IEEE Computer Architecture Letters, 17(1): 37-41, 2017.

[17] Bryan S. Kim, Jongmoo Choi, and Sang Lyul Min. Design trade offs for SSD reliability. In 17th USENIX Conference on File and Storage Technologies (FAST 19), pages 281-294, Boston, MA, 2019.

[18] Wonyoung Lee, Mincheol Kang, Seokin Hong, and Soontae Kim. Interpage-based endurance-enhancing lower state encoding for mlc and tlc flash memory storages. IEEE Transactions on Very Large Scale Integration (VLSI) Systems, 27 (9): 2033-2045, 2019.

[19] Leveldb. https://github.com/google/leveldb., 2014.

[20] Qiao Li, Min Ye, Yufei Cui, Liang Shi, Xiaoqiang Li, Tei-Wei Kuo, and Chun Jason Xue. Shaving retries with sentinels for fast read over high-density 3d flash. In 2020

53rd Annual IEEE/ACM International Symposium on Microarchitecture (MICRO), pages 483-495, 2020.

[21] Qiao Li, Min Ye, Tei-Wei Kuo, and Chun Jason Xue. How the common retention acceleration method of 3d nand flash memory goes wrong? In Proceedings of the 13th ACM Workshop on Hot Topics in Storage and File Systems, pages 1-7, 2021.

[22] Weihua Liu, Fei Wu, Xiang Chen, Meng Zhang, Yu Wang, Xiangfeng Lu, and Changsheng Xie. Characterization summary of performance, reliability, and threshold voltage distribution of 3d charge-trap nand flash memory. ACM Transactions on Storage (TOS), 18(2): 1-25, 2022.

[23] Yixin Luo, Yu Cai, Saugata Ghose, Jongmoo Choi, and Onur Mutlu. Warm: Improving nand flash memory lifetime with write-hotness aware retention management. In 2015 31st Symposium on Mass Storage Systems and Technologies (MSST), pages 1-14. IEEE, 2015.

[24] Yixin Luo, Saugata Ghose, Yu Cai, Erich F Haratsch, and Onur Mutlu. Heatwatch: Improving 3D NAND flash memory device reliability by exploiting self-recovery and temperature awareness. In 2018 IEEE International Symposium on High Performance Computer Architecture (HPCA), pages 504-517, 2018.

[25] Yixin Luo, Saugata Ghose, Yu Cai, Erich F Haratsch, and Onur Mutlu. Improving 3d nand flash memory lifetime by tolerating early retention loss and process variation. Proceedings of the ACM on Measurement and Analysis of Computing Systems, 2(3): 1-48, 2018.

[26] Stathis Maneas, Kaveh Mahdaviani, Tim Emami, and Bianca Schroeder. Operational characteristics of ssds in enterprise storage systems: A large-scale field study. In 20th USENIX Conference on File and Storage Technologies (FAST 22), pages 165-180, 2022.

[27] Shiqiang Nie, Weiguo Wu, and Chi Zhang. Data pattern aware reliability enhancement scheme for 3d solid-state drives. ACM Transactions on Embedded Computing Systems (TECS), 20 (5s): 1-20, 2021.

[28] Nikolaos Papandreou, Thomas Parnell, Haralampos Pozidis, Thomas Mittelholzer, Evangelos Eleftheriou, Charles Camp, Thomas Griffin, Gary Tressler, and Andrew Walls. Enhancing the reliability of mlc nand flash memory systems by read channel optimization. ACM Transactions on Design Automation of Electronic Systems (TODAES), 20 (4): 1-24, 2015.

[29] Jisung Park, Myungsuk Kim, Myoungjun Chun, Lois Orosa, JihongKim, and Onur Mutlu. Reducing solid-state drive read latency by optimizing read-retry. In Proceedings of the 26th ACM International Conference on Architectural Support for Programming Languages and Operating Systems, pages 702-716, 2021.

[30] Ted Pekny, Luyen Vu, Jeff Tsai, Dheeraj Srinivasan, Erwin Yu, J. E. Pabustan, Joe Xu, et al. A 1-tb density 4b/cell 3d-nand flash on 176-tiertechnology with 4-independent planes for read using cmos-under-the-array. International Solid-State Circuits Conference (ISSCC), 65:1-3, 2022.

[31] Borja Peleato, Rajiv Agarwal, John M Cioffi, Minghai Qin, and Paul HSiegel. Adaptive read thresholds for nand flash. IEEE Transactions on Communications, 63(9): 3069-3081, 2015.

[32] Karol J Piczak. Esc: Dataset for environmental sound classification. In Proceedings of the 23rd ACM international conference on Multimedia, pages 1015-1018, 2015.

[33] Edwin H-M Sha, Congming Gao, Liang Shi, Kaijie Wu, Mengyin gZhao, and Chun Jason Xue. Asymmetric error rates of cell states exploration for performance improvement on flash memory based storage systems. IEEE Transactions on Computer-Aided Design of Integrated Circuits and Systems, 36(8): 1340-1352, 2016.

[34] Liang Shi, Longfei Luo, Yina Lv, Shicheng Li, Changlong Li, and Edwin Hsing-Mean Sha. Understanding and optimizing hybrid ssd with high-density and low-cost flash memory. In 2021 IEEE 39 thInternational Conference on Computer Design (ICCD), pages 236-243, 2021.

[35] Debao Wei, Zhelong Piao, Hua Feng, Liyan Qiao, Cong Hu, and Xiyuan Peng. Tcse: A target cell states elimination coding strategy for highly reliable data storage based on 3d nand flash memory. IEEE Transactions on Computer-Aided Design of Integrated Circuits and Systems, 2022.

[36] Debao Wei, Liyan Qiao, Shiyuan Wang, and Xiyuan Peng. Fixation ratio of error location-aware strategy for increased reliable retention time of flash memory. IEEE Transactions on Very Large Scale Integration (VLSI) Systems, 24(10): 3145-3155, 2016.

[37] Qin Xiong, Fei Wu, Zhonghai Lu, Yue Zhu, You Zhou, Yibing Chu, Changsheng Xie, and Ping Huang. Characterizing 3d floating gate nand flash: Observations, analyses, and implications. ACM Transactions on Storage (TOS), 14(2): 1-31, 2018.

[38] Gala Yadgar, MOSHE Gabel, Shehbaz Jaffer, and Bianca Schroeder. Ssd-based workload characteristics and their performance implications. ACM Transactions on Storage (TOS), 17(1): 1-26, 2021.

[39] YEESTOR. Ys9083xt/ys9081xt ssd platform. http://www.yeestor.com/index-product-info-id-946-cid-33-pid-3-infopid-33.html, 2018.

[40] Jui-Nan Yen, Yao-Ching Hsieh, Cheng-Yu Chen, Tseng-Yi Chen, Chia-Lin Yang, Hsiang-Yun Cheng, and Yixin Luo. Efficient bad block management with cluster similarity. In 2022 IEEE International Symposium on High-Performance Computer Architecture (HPCA), pages 503-513, 2022.

[41] David Kuang-Hui Yu and Jen-Wei Hsieh. A management scheme of multi-level retention-time queues for improving the endurance of flash-memory storage devices. IEEE Transactions on Computers, 69(4): 549-562, 2019.

[42] David Kuang-Hui Yu and Jen-Wei Hsieh. Differential evolution algorithm with asymmetric coding for solving the reliability problem of 3d-tlc ct flash memory storage systems. IEEE Transactions on Computer-Aided Design of Integrated Circuits and Systems, 2021.

[43] Ta-Ching Yu, Chin-Hsien Wu, and Yan-Qi Liao. Crrc: Coordinating retention errors, read disturb errors and huffman coding on tlc nand flash memory. IEEE Transactions on Dependable and Secure Computing, 2022.

[44] Jie Zhang and Myoungsoo Jung. Zng: Architecting gpu multi-processors with new flash for scalable data analysis. In 2020ACM/IEEE 47th Annual International Symposium on Computer Architecture (ISCA), pages 1064-1075, 2020.

[45] Meng Zhang, Fei Wu, Qin Yu, Weihua Liu, Yifan Wang, and Changsheng Xie. Exploiting error characteristic to optimize read voltage for 3-d nand flash memory. IEEE Transactions on Electron Devices, 67(12): 5490-5496, 2020.

[46] Wenhui Zhang, Qiang Cao, and Zhonghai Lu. Bit-flipping schemes upon mlc flash: Investigation, implementation, and evaluation. IEEE Transactions on Computer-Aided Design of Integrated Circuits and Systems, 38 (4): 780-784, 2018.

[47] Yutong Zhao, Wei Tong, Jingning Liu, Dan Feng, and Hongwei Qin. Cesr: A cell state remapping strategy to reduce raw bit error rate of mlc nand flash. In MSST, pages 161-171, 2019.

SUMMARY

This disclosure in one aspect provides a computer-implemented method for encoding data to be stored in a solid-state storage device. The method includes the steps of, providing a source data; calculating an entropy of the source data; applying a first encoding scheme to encode the source data into an encoded data, if the entropy is below a threshold; and applying a second data encoding scheme to encode the source data into the encoded data, if the entropy is equal to or higher than the threshold. The first encoding scheme is adapted to encode most frequently combined characters in the source data into predetermined characters to increase ratio of the predetermined characters in the encoded data. The second data encoding scheme is adapted to encode evenly distributed combined characters into a plurality of patterns with the predetermined characters, in order to increase the ratio of the predetermined characters in the encoded data.

In some embodiments, the step of applying the first data encoding scheme further includes the steps of: counting frequencies of all combinations of characters, wherein each combination contains a first number of the characters; sorting the combinations according to their frequencies; and identifying one of the combinations that has a highest frequency as the most frequently combined characters.

In some embodiments, the step of applying the first data encoding scheme further includes the steps of: determining a second number of combinations, of which the frequencies immediately follow that of the most frequently combined characters; and encoding the second number of combinations and the most frequently combined characters into different combinations of the predetermined characters.

In some embodiments, the second number equals to or is smaller than a square of the first number which is then subtracted by one.

In some embodiments, the first number is two or four.

In some embodiments, the step of encoding the second number of combinations is conducted based on a mapping table, the mapping table created upon a first write request into the solid-state storage drive.

In some embodiments, the mapping table is stored in an out-of-band (OOB) area of a page within a flash memory of the solid-state storage drive.

In some embodiments, the step of applying the second data encoding scheme further includes the steps of identifying a pair of combinations of characters including a first combination and a second combination; encoding the first combination into a first one of the plurality of patterns; and encoding the second combination into a second one of the plurality of patterns. The first combination has more of the predetermined characters than the second combination.

In some embodiments, the first combination and the second combination each contain a first number of the characters. The first and second ones of the plurality of patterns each contain a second number of the predetermined characters. The first number is smaller than the second number.

In some embodiments, a difference between the first number and the second number is one.

In some embodiments, the first number of most significant characters in the first one of the plurality of patterns are identical to the first number of most significant characters in the second one of the plurality of patterns.

In some embodiments, the steps of encoding the first and second combinations are conducted based on a mapping table, and the mapping table is pre-defined prior to the step of applying the second data encoding scheme.

In some embodiments, the second combination contains none of the predetermined characters, and the first combination consists entirely of the predetermined characters.

In some embodiments, the step of calculating the entropy of the source data further includes conducting integer operations on the source data based on a log lookup table.

In some embodiments, the step of calculating the entropy of the source data is performed by an embedded processor in a controller of the solid-state storage device.

In some embodiments, the predetermined characters represent voltage states in the solid-state storage device.

In some embodiments, the number of the predetermined characters is two.

In some embodiments, the first encoding scheme is skewed coding scheme, and the second encoding scheme is reversed Huffman coding.

According to another embodiment of the invention, there is provided a non-transitory computer-readable memory recording medium having computer instructions recorded thereon. The computer instructions, when executed on one or more processors, cause the one or more processors to perform operations according to the methods described above.

According to a further embodiment of the invention, there is a computing system that includes one or more processors, a memory containing instructions that, when executed by the one or more processors, cause the computing system to perform operations according to the methods described above.

In some embodiments, the computing system further includes a solid-state storage device controller. The one or more processors are one or more embedded processors in the solid-state storage device controller.

Embodiments of the invention therefore provide methods, apparatuses and systems that enable source data encoding in solid-state storage device such as 3D-NAND, and which effectively improve the reliability of long-term storage for cold data and thereby extend the lifespan of storage devices. Embodiments disclosed herein challenges the conventional notion that data randomization is the optimal strategy, demonstrating that encoding source data according to specific patterns in the solid-stage storage device results in a significant reliability enhancement over extended periods. Consequently, in exemplary embodiments of the invention two encoding schemes, such as skewed coding and reversed Huffman coding, are designed based on the entropy values of the source data. In the exemplary embodiments, when the entropy of the source data is low, indicating a structured data composition, skewed coding is applied to encode the source data into an ideal pattern before storage. Conversely, when the entropy is high, indicating randomized data without discernible patterns, reversed Huffman coding is employed for encoding prior to storage. Both encoding schemes operate exclusively during data storage and retrieval processes, merely altering the data representation, effectively optimizing data reliability with minimal overhead. As such, one can see that the method dynamically selects the appropriate encoding scheme based on the composition of source data, offering substantial gains for virtually all workloads.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 1 illustrates an exemplary 3D NAND flash blocks and cells in a TLC (triple-level cell) memory, to which embodiments of the invention may be applied to.

FIG. 13b shows the $V_{th}$ distribution of encoded data using skewed coding based on the original data in FIG. 13a.

FIG. 16a shows the number of bit errors at different layers of an original data in an example (Amazon).

FIG. 16b shows the number of bit errors at different layers using skewed coding based on the original data in FIG. 16a.

DETAILED DESCRIPTION

Figure 1:
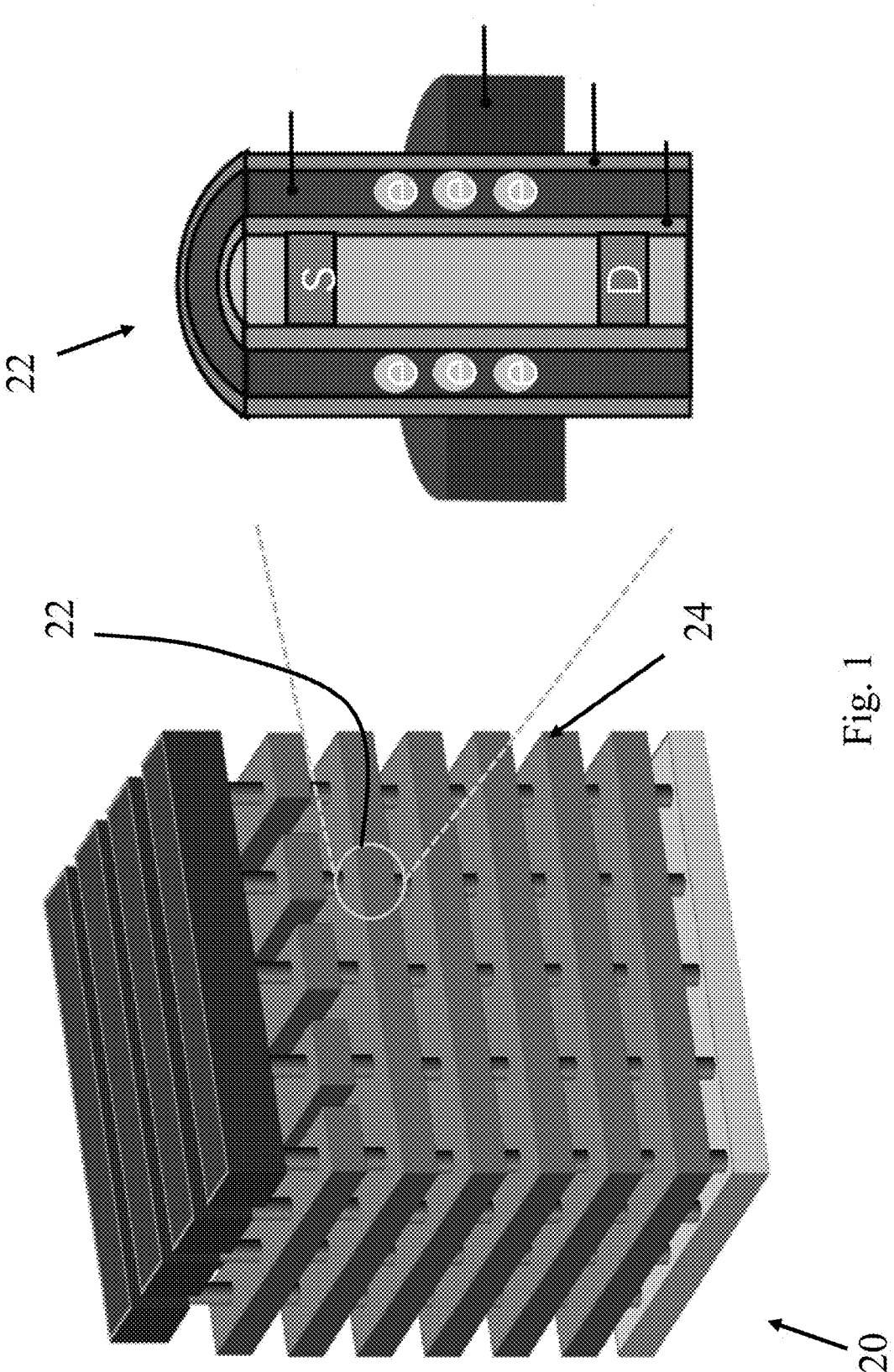
Figure 2:
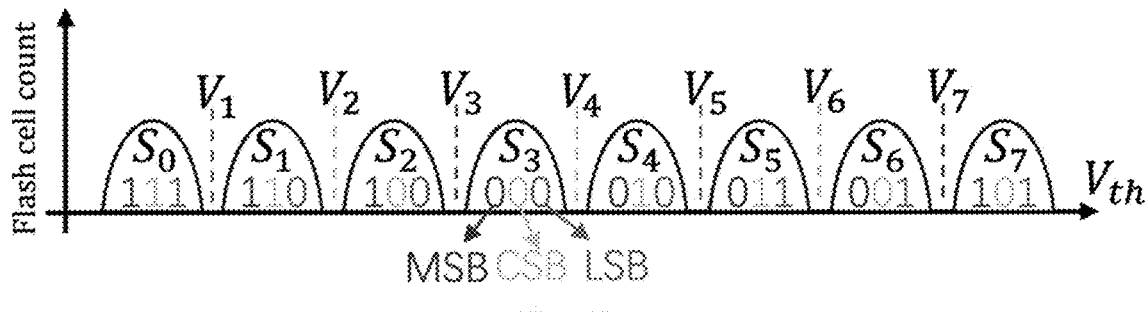
FIG. 2 shows a $V_{th}$ distribution of the TLC memory of FIG. 1.

Before going to the details of data encoding methods according to embodiments of the invention, solid-state storage devices to which the methods can be applied to will be introduced. One example of solid-state storage devices is a 3D NAND flash memory chip which contains multiple dies, each of which is composed of multiple planes. A plane contains thousands of flash blocks 20, which are three-dimensional arrays of flash cells 22, as shown in FIG. 1. Read and write operations in 3D NAND flash are conducted on a wordline (WL) 24, as the control gates of all cells in the horizontal direction are connected to each another. A WL 24 could have millions of flash cells 22 for high densities. By storing a certain amount of charge, flash cells 22 encode data bits into multiple levels of threshold voltage ($V_{th}$), as shown in FIG. 2. The $V_{th}$ distribution of triple-level cell (TLC) flash memory in FIG. 1 is the most popular type in 3D NAND memories. The most/center/least bits in a WL 24 form MSB (Most Significant Bit)/CSB (Center Significant Bit)/LSB (Least Significant Bit) pages, respectively.

With the impacts of several types of disturbances and noises, the $V_{th}$ of flash cells could be biased, and bit errors would be introduced on the stored data. During programming and erase (P/E) operations, the high voltages damage flash cells' capability of storing charges, thus resulting in high RBERs in stored data after repeated P/E cycles. Read and program operations on a WL slightly increase the $V_{th}$ of neighboring flash cells inside the same flash block, when extra charges could be unintentionally injected into the disturbed cells. Over the retention period, the charges slowly leak out of flash cells, which is the major error source in 3D NAND flash memories. The leakage rate is closely related to the amount of charges, where the leakage is faster in cells with higher threshold voltages. With the increase in density and capacity, these error issues introduce higher error rates to 3D NAND flash than ever. To overcome the reliability issues, various strategies have been proposed in existing research. In the following sections how data coding affects the reliability of 3D NAND flash memory will be discussed.

NAND flash memories store a certain amount of charges in cells to represent the stored data. The different voltage levels representing different data naturally has various capabilities of maintaining the charges. This phenomenon has been well studied in planar flash memories, followed by some strategies proposed to explore the characteristics for reliability enhancement. These methods have been applied in 3D NAND flash memories in these years, which could be summarized into three strategies.

The first strategy is to eliminate some of the high voltage states that suffer from high RBERs [11, 35]. In TLC flash, there are 8 voltage states to represent 3 bits. The errors mainly occur at the read voltage between the pairs of high voltage states. Eliminating one or several of the high voltage states could avoid the happening of high RBERs. This strategy sacrifices the storage capacity because fewer voltage states mean fewer bits stored. Thus, the strategy is usually adopted in the late life stage of NAND flash memory, by trading capacity for reliability enhancement.

The second strategy exploits the content-dependent characteristic for performance or lifetime optimization [27, 33]. For the data with lots of low-RBER states, the programming could be conducted with coarse programming steps for better performance, within the error correction capability of error correction codes (ECC) [33]. Another method applies fine-grained programming steps for the voltage states that occur with high probability in the written data [27].

The third strategy is to produce more reliable states by mapping the high voltage states to the low voltage states. The motivation for this group of methods comes from the observation that high voltage states could suffer from severe retention loss, which is the main error source in both planar and 3D NAND flash memories. With the goal of generating more low voltage states, different strategies were proposed. Since the lowest voltage state represents '11' in multi-level cell (MLC) flash and '111' in TLC flash, increasing the population of 1 in the encoded data could result in more low voltage states [9, 10, 18, 36, 46]. A common method is to flip bits if the population of 0 is more than 1, and the differential evolution algorithm is further introduced to decide when to flip bits [42]. Zhao et al. consider both the retention loss and program disturbance, where bits are flipped in different ways for different data. This group of methods requires recording the flag whether the bits are flipped, which could be very high for these methods conducted in the granularity of several bits.

In this description, a thorough study on different coding strategies and analysis of their impacts on data reliability is conducted. Expected observations will be shown such as high voltage states do suffer from more errors, and unexpected observations such as mapping data to low voltage states do not always enhance the data reliability on 3D NAND.

Next, the flash reliability with and without the randomizer is characterized to show why the randomizer is widely applied in real flash chips and how its performance is limited in current 3D NAND flash memories. The experiments are conducted on YEESTOR 9081 and 9086 flash memory testing platform, which serves as a flash controller to manage NAND flash chips [39]. The platform sends basic flash operation commands and, the RBER from the readout data is mainly collected. The evaluations are conducted on eight different flash chips from four vendors, including five TLC and three QLC flash chips. Though each chip type has its own distinct property, the same conclusions were made on all of them. For page limit, the data from three of them is mainly presented and the detailed observations on one TLC flash chip is discussed.

There are constructed 24 data patterns for TLC flash as follows, which are grouped into three categories.

Figure 3A:
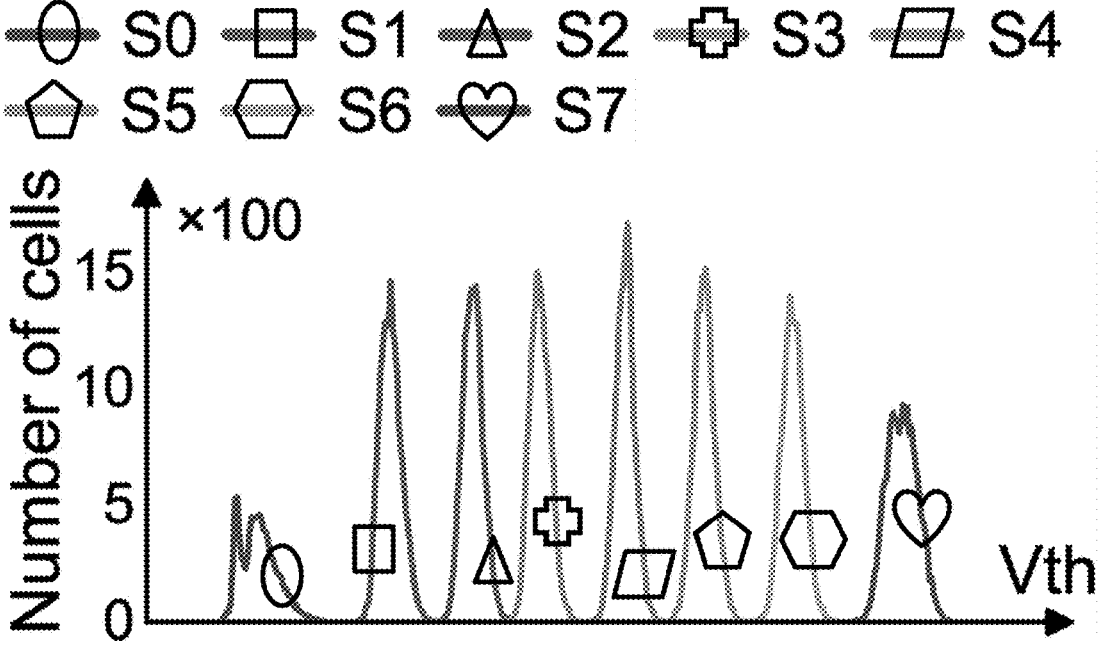
FIG. 3a shows the threshold voltage distribution of "Rand" (random) data pattern.

Rand: Data is randomized, where the data is evenly distributed among 8 voltage states, as shown in FIG. 3a. The randomizer is implemented by a linear feedback shift register, which shifts the bits one position to the right and replaces the vacated bit with the XOR of the bit shifted. The original information bits would be transformed bit by bit based on a polynomial function. This is widely applied in real NAND flash chips so that different data would not present significant RBER variation.

Figure 3B:
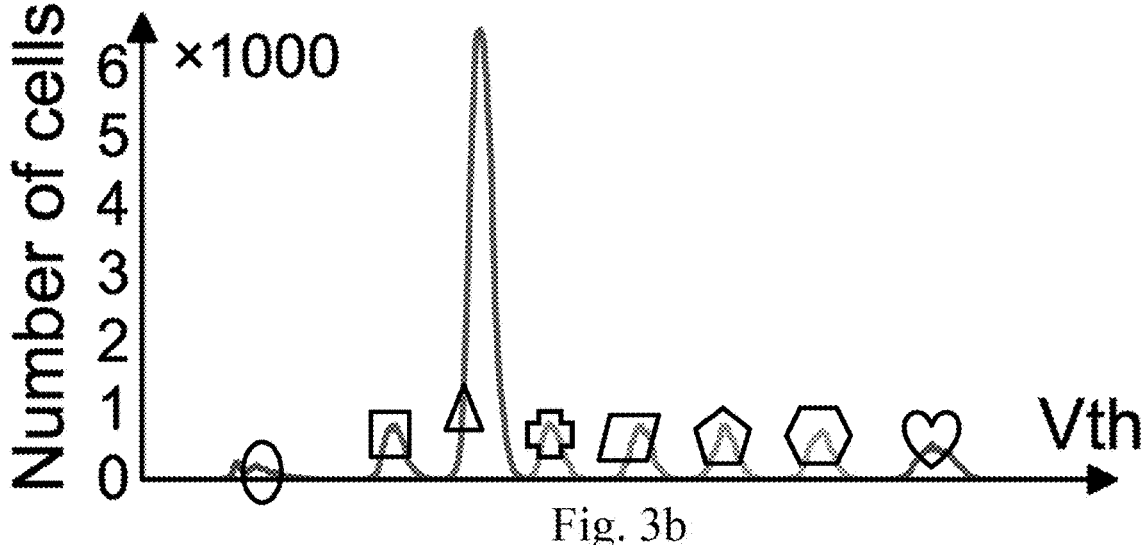
FIG. 3b shows the threshold voltage distribution of a single-state data pattern of "PS2".
Figures 3C, 3D, 3E:
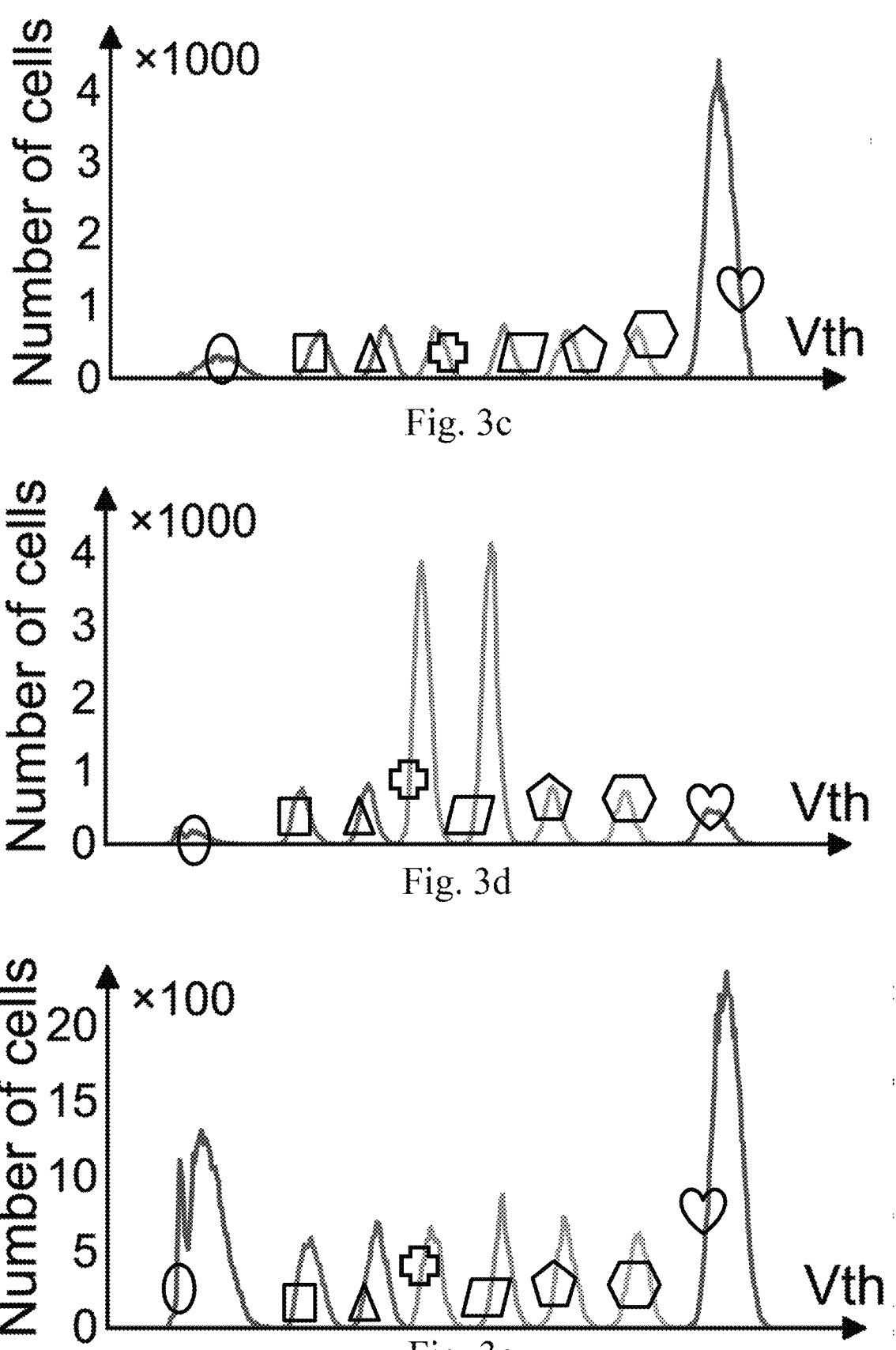
FIG. 3c shows the threshold voltage distribution of a single-state data pattern of "PS7".
FIG. 3d shows the threshold voltage distribution of a double-state data pattern of "PS3+PS4".
FIG. 3e shows the threshold voltage distribution of a double-state data pattern of "PS0+S7".

Single State (SS): $9/16$ of the data will be programmed to one of the 8 voltage states ($S_i$, $0 \le i \le 7$), and $7/16$ of data is evenly distributed among other 7 voltage states, as shown in FIGS. 3b to 3c. PSi is used to represent these patterns.

Figure 3F:
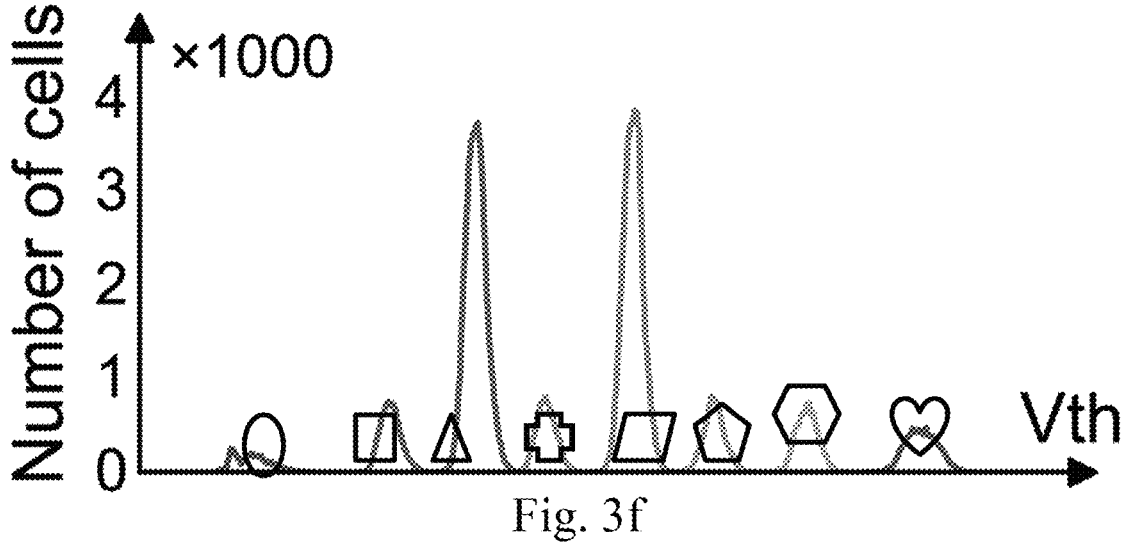
FIG. 3f shows the threshold voltage distribution of a double-state data pattern of "PS2+S4".

Double State (DS): $5/8$ of data is programmed to $S_i$ and $S_j$, and data is evenly distributed among these two states. The remaining of data is evenly distributed among other 6 voltage states, as shown in FIGS. 3d to 3f. PSi+Sj is used to represent the corresponding data patterns.

For QLC flash, 0 to F are used to label 16 voltage states from low to high and construct data patterns dominated by specific voltage states. For example, P_06BF represents the pattern that has lots of voltage states indexed with 0 (the lowest state), 6, B, and F (the highest state). In the following evaluations, a total of 24 different data patterns are implemented for comparison. Flash blocks with similar reliability strength are selected to avoid bias from process variations. Each data pattern is programmed into two blocks to further reduce the experimental bias.

Several observations on the RBERs of pages among different coding strategies are discussed, where one can observe both expected and unexpected error behaviors. FIGS. 4a-4d shows the average RBERs of all WLs in a 3D NAND block. 1000 and 100 P/E cycles are performed on TLC and QLC flash blocks, respectively, then the flash chips are baked under 100° C. for 2 hours to simulate the retention loss (FIGS. 4a-4c), and 300 block read operations are conducted to introduce read disturbance (FIG. 4d). In FIGS. 4a-4d, the dashed lines present the bit errors of MSB page in Rand.

Observation 1: Compared to Rand, some data patterns have higher RBER, and some have lower RBER. This observation can be made in all eight evaluated flash chips, while the patterns that have lower/higher RBER are not the same among flash chips. FIGS. 4a-4d illustrate three of them, where each chip presents different degrees of variations among patterns. The differences among chips could be caused by multiple aspects, such as the manufacturing process of vendors, the design of programming algorithms, and so on. In the following section, the data collected on TLC flash B is discussed in detail.

Figure 4A:
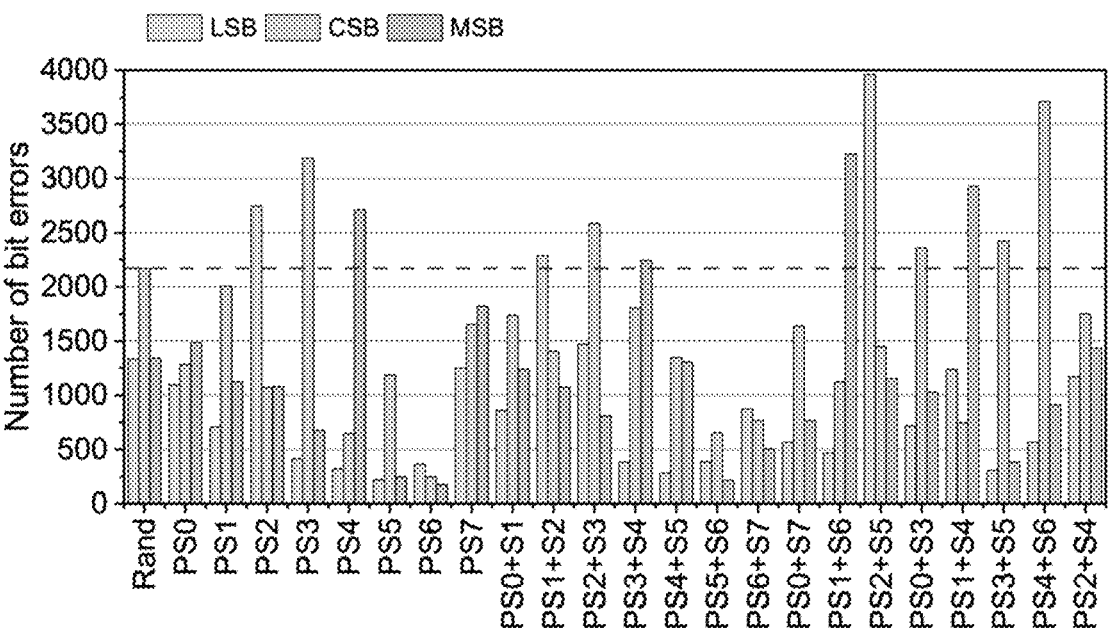
FIG. 4a shows error comparison of different coding strategies on TLC Flash A (Retention). The bars in each grouping correspond to, from left to right: LSB, CSB and MSB, respectively.
Figure 4B:
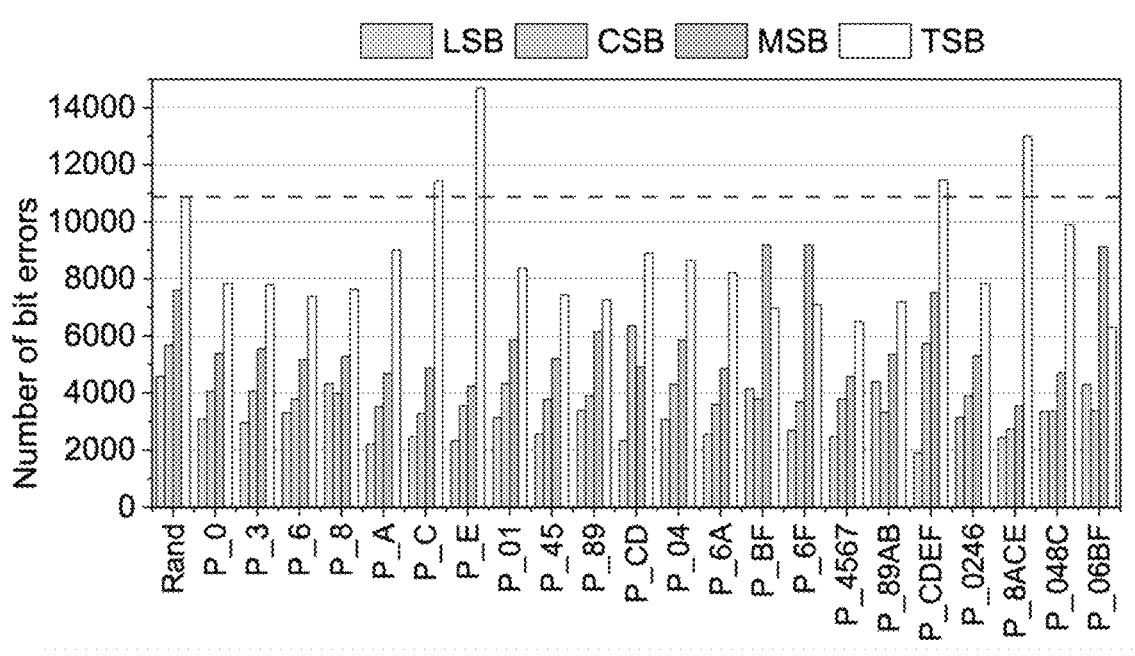
FIG. 4b shows error comparison of different coding strategies on QLC Flash (Retention). The bars in each grouping correspond to, from left to right: LSB, CSB, MSB and TSB, respectively.
Figure 4C:
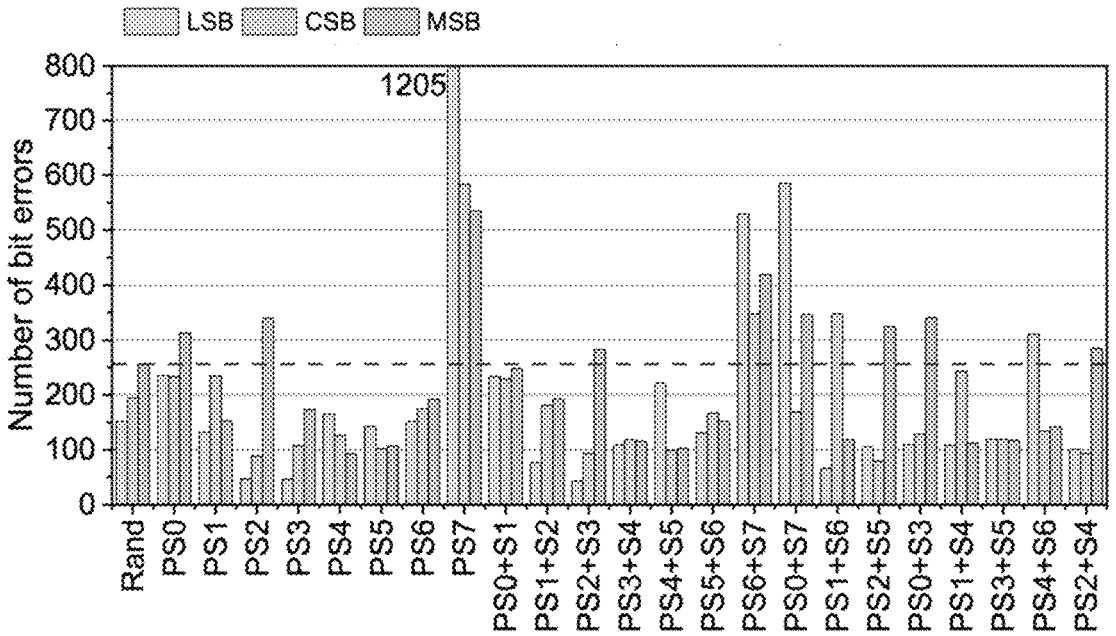
FIG. 4c shows error comparison of different coding strategies on TLC Flash B (Retention). The bars in each grouping correspond to, from left to right: LSB, CSB and MSB, respectively.
Figure 4D:
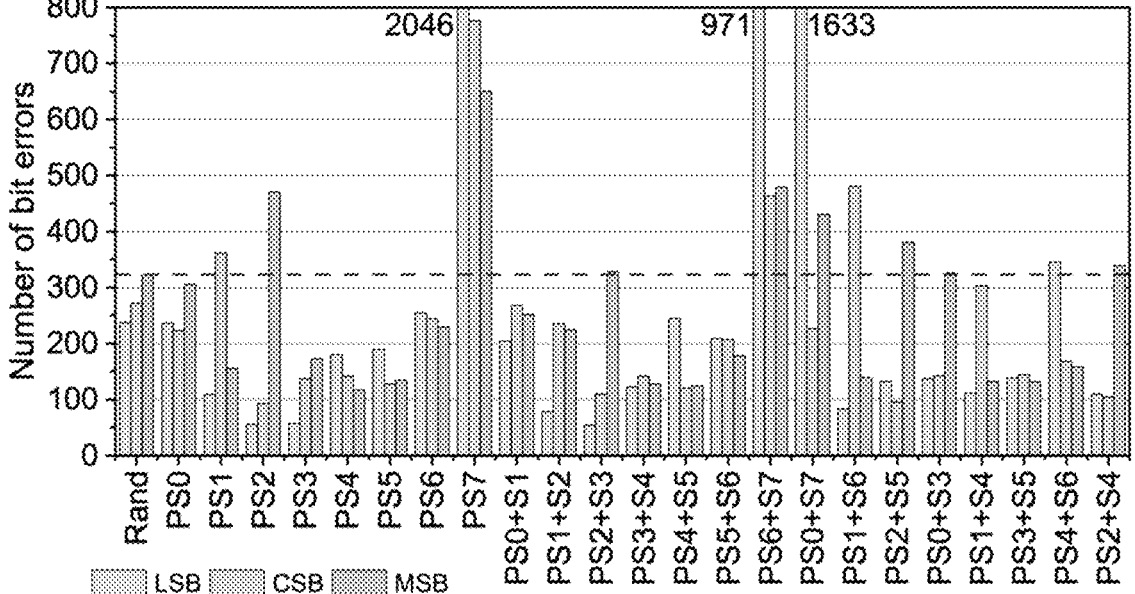
FIG. 4d shows error comparison of different coding strategies on TLC Flash B (Retention+Disturbance). The bars in each grouping correspond to, from left to right: LSB, CSB and MSB, respectively.

Specifically, three single-state strategies in FIG. 4c have higher RBERs than Rand, including PS0, PS2, and PS7. Especially for PS7, which has lots of high voltage state S7, the LSB RBER is more than 4 times of Rand, while other single-state strategies have lower RBERs than Rand. The extremely high RBER in PS7 is not surprising, because high voltage states suffer from more bit errors. Lots of cells are programmed to S7, and they tend to suffer from severe retention loss, leading to high RBERs. However, what is unexpected is that the good data patterns (RBERs lower than Rand) are not those dominated by low voltage states, but those dominated by medium voltage states. This observation also stands in FIG. 4d, where flash chips have endured both retention loss and read disturbance. The RBERs in FIG. 4d have a significant increase compared to those in FIG. 4c. Considering the impacts of read disturbance, the RBER differences among different data patterns become even larger. For example, the RBER increase in PS7, whose RBER after retention is already very high, is much more significant than others.

For double-state coding, three DS strategies (PS3+S4, PS5+S6, and PS3+S5 in FIG. 4c) have much lower RBERs than Rand. Similarly, those patterns dominated by S7 have higher RBERs and those dominated by low voltage states might also have high RBERs. For example, all three pages in PS0+S1 have comparable RBERs to the MSB of Rand. This observation is also contrary to the common belief that mapping cells to low voltage states will improve the reliability [18, 36, 46]. Based on the above analysis, the reason why randomizer is widely applied in current 3D NAND flash memory chips can be concluded. As user data could have very different distributions, the adoption of the randomizer avoids extreme cases with high RBERs, such as patterns dominated by S7. Nevertheless, the randomizer rules out the opportunities to explore data patterns with lower RBERs.

Observation 2: The variations among the three pages in Rand of TLC flash, which is universal in all flash memories, could be relieved by some data patterns. Reading a flash page requires one or several specific read voltages. Due to the RBER variations of different voltage states, the three pages of Rand distribution usually have different RBERs [1]. This characteristic is common in 3D NAND flash, which limits flash reliability because the worst-case RBER usually defines the design of reliability management. Other than Rand, FIGS. 4a-4d show that RBER variations among three pages exist in most coding strategies. The page that has the highest RBER among the three pages could also be different in different coding strategies. For example, the MSB page has the highest RBER in Rand, while LSB page has the highest RBER in PS7. However, one SS strategy PS6, and two DS strategies, PS3+S4 and PS4+S5, result in relatively balanced RBERs among three pages. One should also notice that it is impossible to guarantee three pages always have the same RBERs under any situation, as the impacts of error sources on different voltage states are different. In this work, flash chips are evaluated under different retention time and different read disturbance and it is found that these two patterns (PS3+S4 and PS4+S5) in TLC flash B perform better than other patterns in all cases, though small variations could still exist in some cases.

In 3D NAND flash memories, bit errors are introduced because the threshold voltage $V_{th}$ of some cells crosses the read voltages, causing misreading of the cells. To explain the above error behaviors of different data patterns, the shifting behaviors of voltage states are studied, and the data of TLC flash B is presented as an example.

Figure 5:
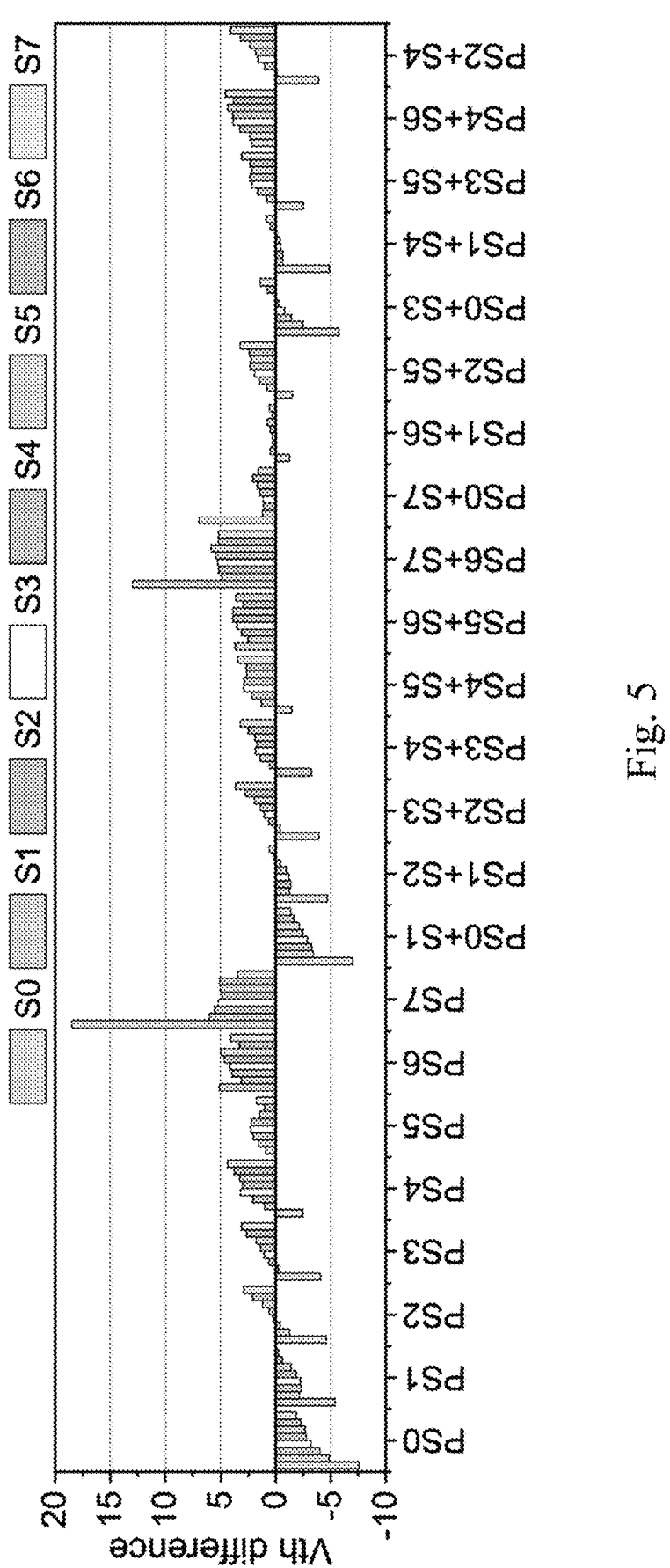
FIG. 5 shows the difference of threshold voltage between Rand distribution and other patterns. The bars in each grouping correspond to, from left to right: S0, S1. S2, S3, S4, S5, S6 and S7, respectively.

Firstly, the $V_{th}$ values among different data patterns is compared. Using Rand as the baseline, FIG. 5 shows the difference of $V_{th}$ in values between other data patterns and Rand. Each bar in the figure represents the value using the $V_{th}$ of a certain pattern minus the $V_{th}$ of Rand. The $v_{th}$ in is the average voltage value of all cells in a block programmed to a specific voltage state. As the figure shows, the voltage difference compared to Rand could be 18 (normalized value), which is very large as the width for a voltage state is 128. In NAND flash memory, the flash cells will be programmed in the same way with the same program voltage. This means the voltage state shifting has significant variations among different data patterns. Specifically, the voltage values of the eight SS data patterns monotonously increase from PS0 to PS7. The data patterns dominated by low voltage states, like PS0 and PS1, have lower voltage values in all voltage states than Rand. While all the voltage states of PS6 and PS7 have much higher values than Rand. These DS patterns show a similar trend in the voltage values, where data patterns dominated by high voltage states would have higher-than-Rand voltage values in (almost) all voltage states, and vice versa. It can be concluded that the voltage states could be easily affected by other voltage states, which is why reducing the high-RBER voltage states does not reduce the overall RBER in high-density 3D NAND flash memories.

Between each pair of adjacent voltage states, one read voltage (V1 to V7) is applied to separate two states. Error bits could be introduced at each read voltage. In the following, read voltages are separated into three groups to discuss the error behaviors. FIGS. 6a-6g show the number of error bits introduced at each read voltage. The bit errors at $V_i$ could be differentiated into two groups: 1) The errors resulting from cells in $S_{i-1}$ being misread as $S_i$ ($S_{i-1}$-Right); 2) The errors resulting from cells in $S_{i-1}$ being misread as $S_{i-1}$ ($S_i$-Left). Only the errors caused by cells shifting to the neighboring states are considered because shifting to far-away states rarely happens [29, 20]. Since the total cell number in different voltage states could be different, the ratio of state errors is also shown, i.e., the ratio of cells that cross the corresponding read voltage, in FIGS. 6a-6g. The following two observations are made regarding the bit errors at each read voltage.

Observation 3: The significant right-shifting of low voltage states occurs in data patterns with lots of cells in low voltage states and also in the patterns dominated by high voltage states. The low read voltages are used to differentiate low voltage states during read operations. The RBER at low read voltages (V1, V2) mainly comes from the right shifting of low voltage states. Because of that, the data patterns dominated by low voltage states, like PS0 and PS1, have more bit errors at low read voltages, and the ratios of right shifting are high. For example, the right-shifting ratio of S1 state in PS1 is 1.6%, and PS1 has lots of cells in S1, thus the number of errors at V2 is as large as 162. However, the unexpected behavior is that the data patterns dominated by high voltage states (like PS7 and PS0+S7) could have an even higher ratio of right shifting than PS1. As shown in FIGS. 6a-6g, PS7 is the pattern with the largest number of bit errors at V1 and V2. Based on the data in FIG. 5, the blocks programmed with lots of high voltage states would have very high voltage values in all voltage states. When those high voltage states suffer from left shifting, the lost charges could easily enter flash cells with low voltages. As a result, lots of low voltage cells in patterns like PS7 would suffer from severe right shifting.

What might not be expected is that the right shifting of S1 is more significant than S0. This is because our characterization only counts the cells that cross the read voltage with bit errors. S0 has a very wide distribution, and the state is far away from read voltage V1. It is more difficult for S0 to cross the read voltage caused by voltage increase. In practice, the voltage increase of S0 is more significant than S1, but the increase does not introduce as many bit errors as the increase in S1.

Figure 6A:
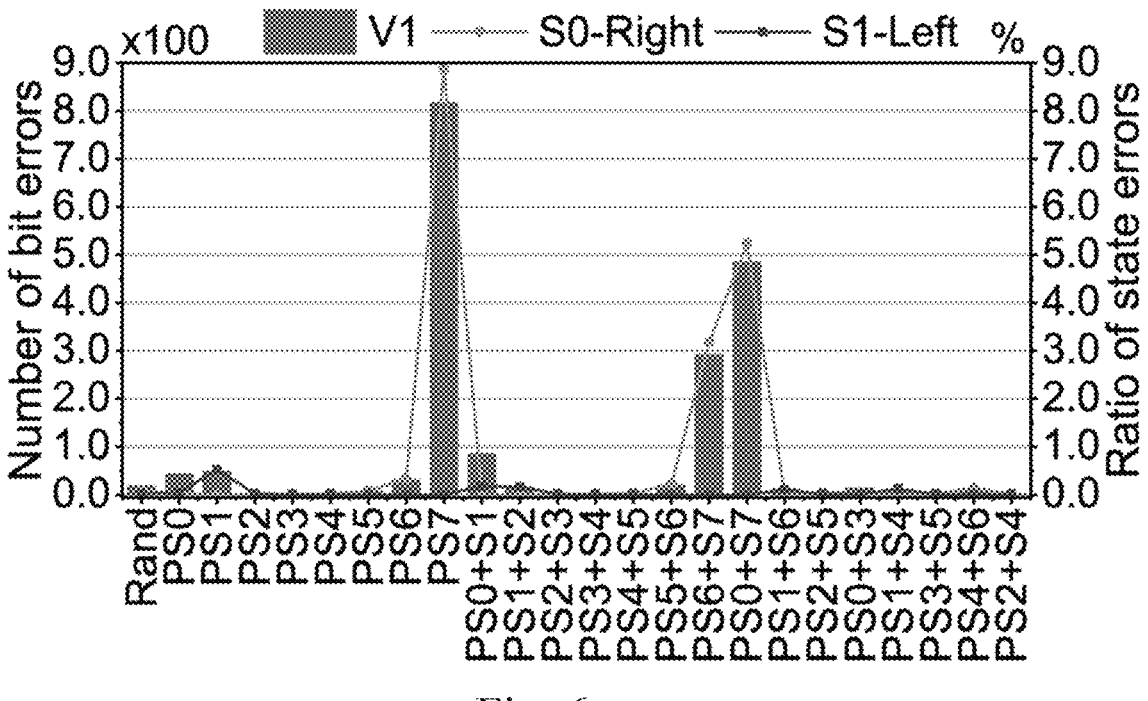
FIGS. 6a-6g depict the number of bit errors at read voltages V1-V7 respectively, and the percentages of left-shifting and right-shifting errors.
Figure 6B:
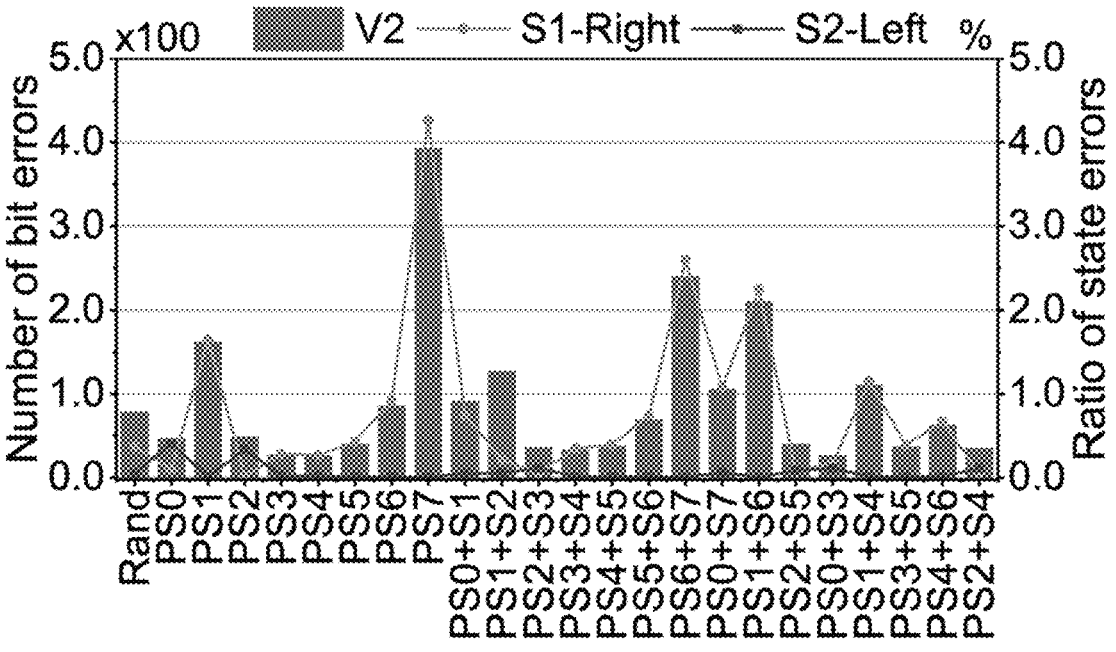
Figure 6C:
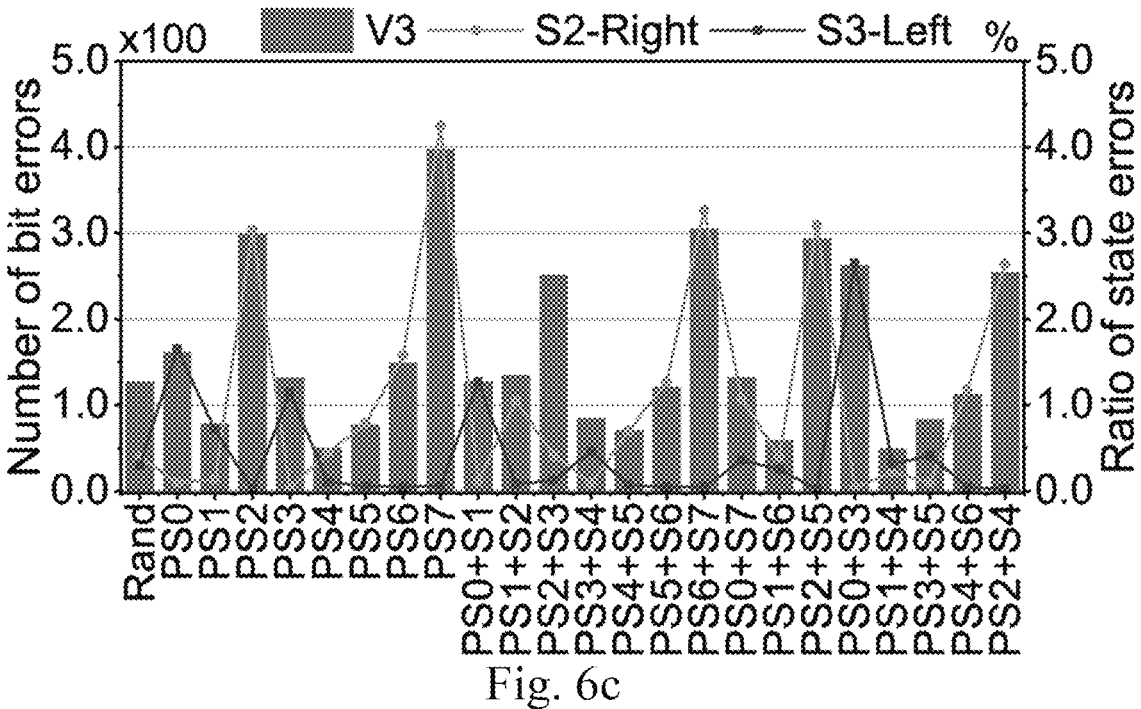
Figure 6D:
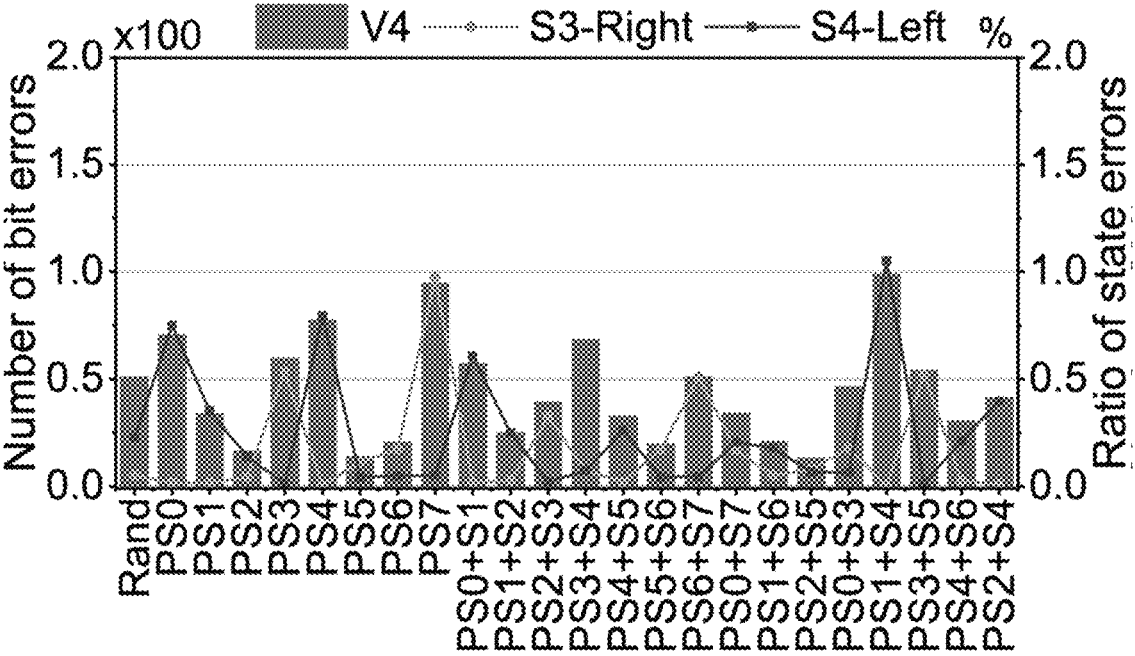
Figure 6E:
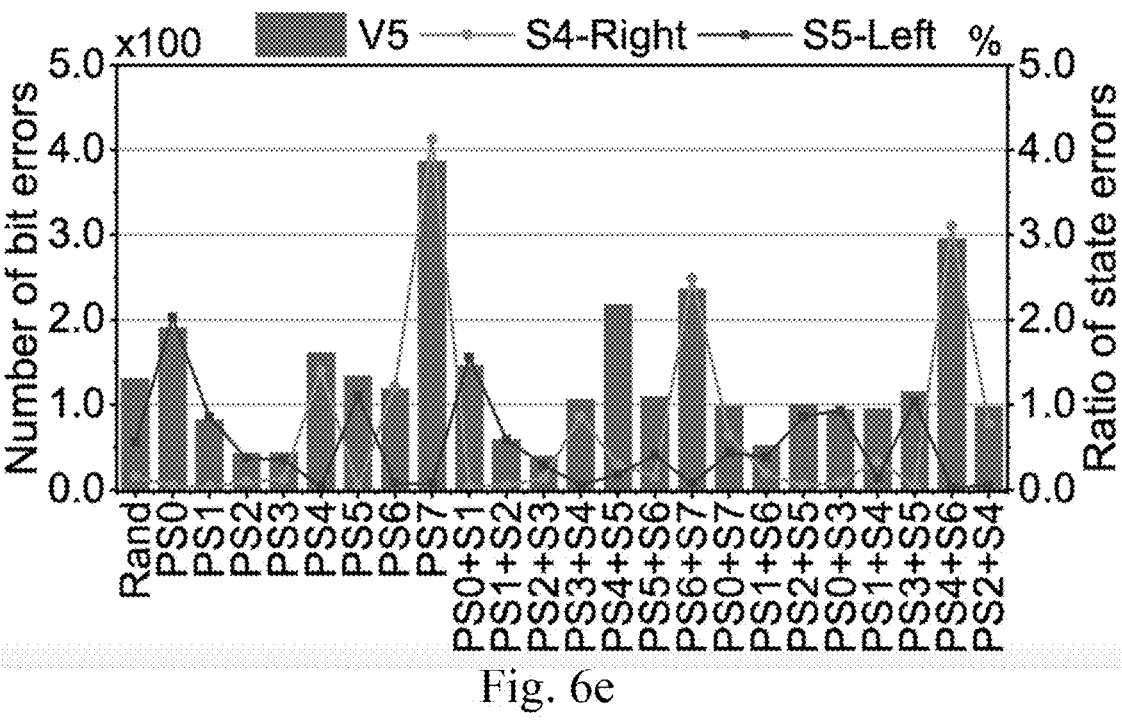
Figure 6F:
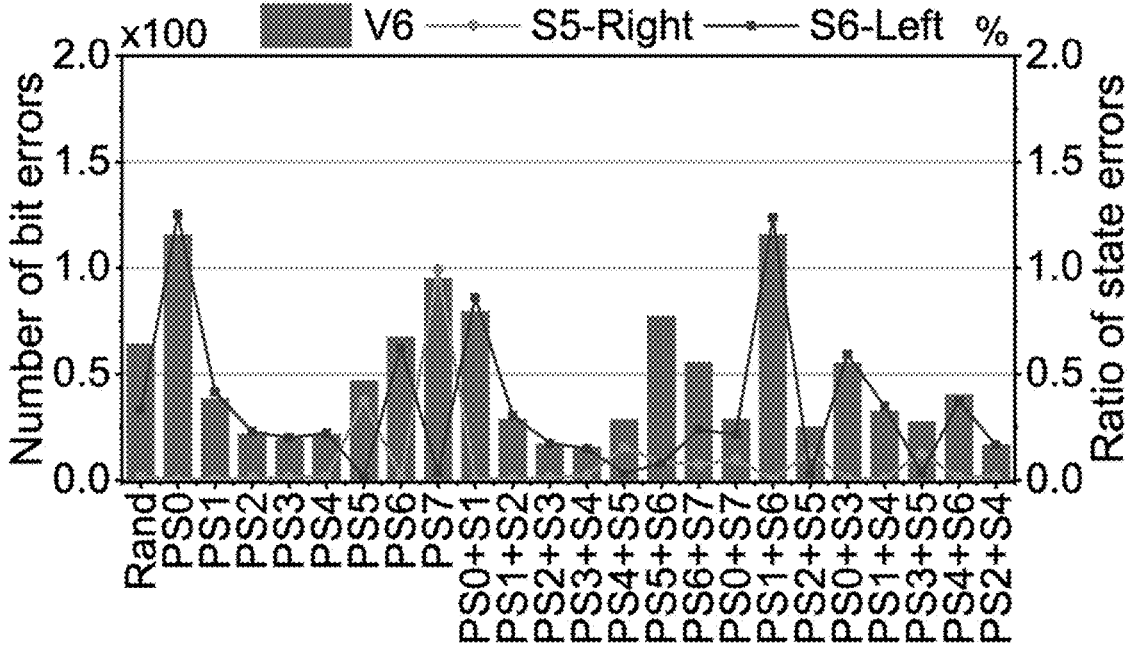
Figure 6G:
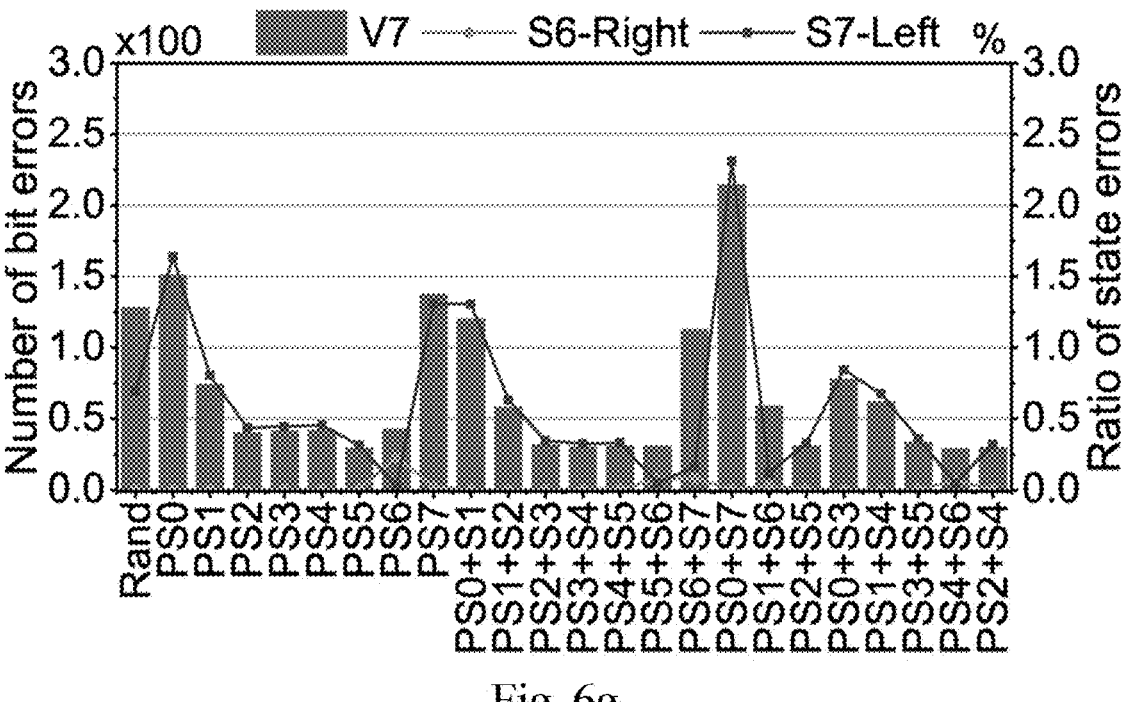

Observation 4: The significant left-shifting of high voltage states occurs in data patterns dominated by high voltage states, also in the patterns dominated by low voltage states. This observation is similar to Observation 3 regarding low read voltages. According to existing work [2], it is known that higher voltages suffer more from retention errors. This is because higher voltage states have more charges, and thus, the leakage speed is higher, which leads to more charge leakage. Therefore, retention errors mainly occur at high read voltages (V6 and V7), e.g., V7 to separate S6 and S7. The RBERs at high voltages largely impact the overall RBER of flash pages. The three patterns with massive cells in S7 (PS7, PS6+S7 and PS0+S7) are exactly the top 3 patterns with the largest number of error bits at read voltage V7, which is not surprising. The high error rate at V7 is mainly because of the left shifting of S7, as shown in FIG. 6g. Similarly, the unexpected behavior is that the data patterns dominated by low voltage states also have a very high ratio of S7 left-shifting, e.g., pattern PS0. The reason is that low voltages in PS0 introduce more chances for high-voltage states to leak charges. This could be verified by PS0+S7, which has the highest ratio of S7 left-shifting. It has many S0 and many S7, thus providing the fastest leakage path from high voltage states to low voltage states.

For medium read voltages (V3, V4 and V5), left-shifting errors are the dominant errors for some data patterns, and right-shifting errors are the dominant errors for others. These patterns with high RBERs at medium read voltages are mainly discussed. V4 is taken as an example for discussion. The errors at V4 include right-shifting errors of S3 and left-shifting errors of S4. The top 4 patterns with high right-shifting errors of S3 are PS3, PS7, PS6+S7 and PS3+S5. PS3 and PS3+S5 contain lots of cells in S3, thus the possibility for S3 to shift is high. PS7 and PS6+S7 contain lots of high voltage states, and the high voltage leads to a high possibility for right shifting. The result further validates the above Observation 3, that cells in a specific state shift to the right either because there are lots of cells in this state or the overall voltage is high. Similarly, the left shifting of V4 validates Observation 4, where cells in a specific state shift to the left either because there are lots of cells in this state or the overall voltage is low.

In summary of the observations discussed above, data patterns with different distributions present very different reliability characteristics. Because of that, NAND flash chips are equipped with a randomizer in the controller to randomize all user data before programming into flash memories. The randomizer is applied by always transforming original user data into the data that have an even distribution over 8 voltage states of TLC. The purpose is to avoid extreme data patterns that could introduce high RBERs. However, as different voltage states also have different reliability characteristics, the randomized data suffer from uneven RBERs among three pages in the same WL of TLC or four pages of QLC. The above characterization shows that exploring certain skewed data patterns could achieve lower RBERs than randomized data, as well as leveling RBERs among three pages in the same WL. Furthermore, previous strategies on planar flash memories that map high voltage states to low voltage states are not applicable to high-density 3D NAND flash memories.

Note that while the analysis of RBER is specific for TLC flash B, it is also applicable to other flash chips with different error characteristics among data patterns. This is because flash chips are equipped with different programming algorithms, which results in different Vth distributions. Nevertheless, the study on voltage shifting could draw similar conclusions for different flash chips, where the shifting could be impacted by the voltage levels of other cells. Therefore, similar characteristics with different specific voltage states exist on all 3D NAND flash chips. In the next section, the above conclusions are explored for reliability enhancement, which could be extended to any 3D NAND flash chip.

Figure 7:
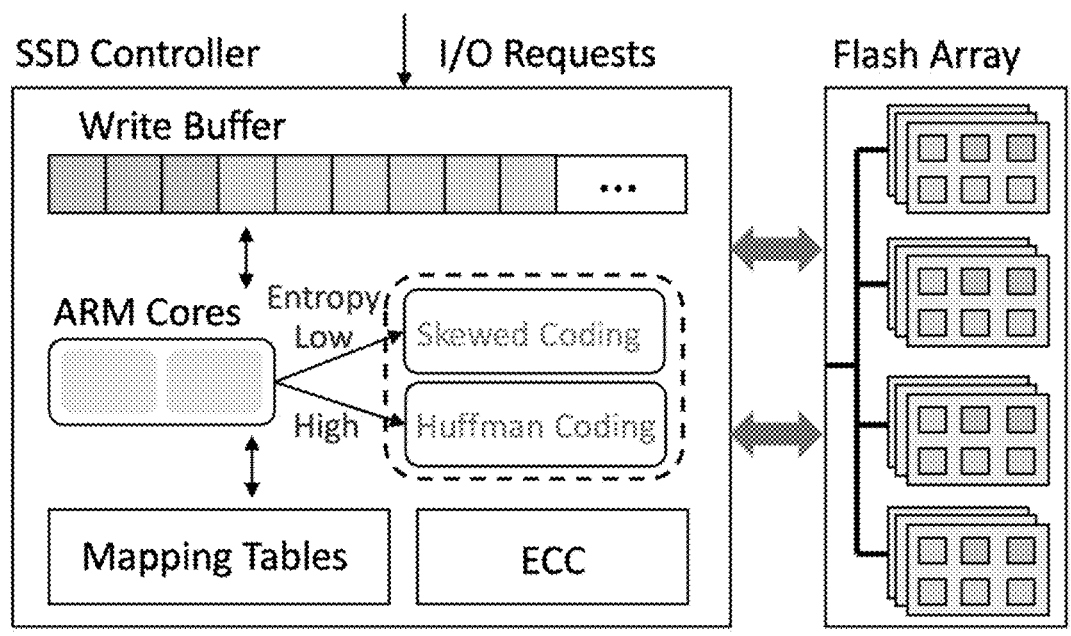
FIG. 7 illustrates a coding strategy according to a first embodiment of the invention, along with exemplary hardware components on which the coding strategy is implemented.

FIG. 7 shows a first embodiment of the invention, which is a computer-implemented method for encoding data to be stored in a solid-state storage device. A flash array 30 is shown in FIG. 7 for the solid-state storage device, and the flash array 30 is in data communication with an SSD (solid-state drive) controller 32 for the solid-state storage device. The SSD controller 32 includes a write buffer 34, ARM cores 38 (which are embedded processors in the SSD controller 32), and mapping tables 36. In essence, the method of FIG. 7 replaces the randomizer with two coding strategies for cold data to enhance reliability in high-density 3D NAND flash memory. The warehouse of cold data is a typical application that has long-retention requirements with tolerance for performance degradation. Because cold data are rarely accessed, the RBER should be kept low after a long time and, the low access frequency indicates negligible impacts on the overall performance. Instead of randomizing the data before programming, the main idea is to construct low-RBER data patterns by coding the original data for reliability enhancement.

As shown in FIG. 7, the data of write requests to the solid-state storage device, which are the source data, are first written to the buffer 34 in the SSD controller 32. The entropy of written data is then calculated to decide the coding strategy. The method of FIG. 7 leverages the processors/cores (i.e. the ARM cores 38) embedded in the SSD controller 32 to calculate the entropy of source data in the buffer 34. For data with low entropy, such as original text and image files, a skewed coding 40 is applied, which exploits the uneven distribution of the original data. This coding requires negligible overhead for storing the mapping table. For data with high entropy, such as compressed and encrypted files, a reversed Huffman coding 42 is applied, which trades off storage space for data reliability as well as flash lifetime. Both of the two data coding schemes reduce the RBERs of data stored on 3D NAND flash, thus increasing the available P/E cycles of flash blocks while reducing the write amplification caused by periodical data refresh. Although the reversed Huffman coding 42 consumes extra storage space, the evaluation reveals that the benefits brought by low RBER significantly surpass the penalties (cf. Section 5 for details). The lifetime improvement by the logical capacity of the flash array will be qualified later.

In the following, the data characteristics of different workloads are analyzed first, which are then classified into four typical data distributions. For not-evenly distributed data, their skewed properties are exploited to introduce a low-overhead skewed encoding strategy for enhancing the reliability of cold data storage. For evenly distributed data, there is no skewed property at any granularity. Thus, a Huffman coding strategy (e.g., the reversed Huffman coding 42 in FIG. 7) is proposed to trade off space for reliability. Finally, the coding procedure and analysis of these two coding mechanisms will be presented.

Figure 8:
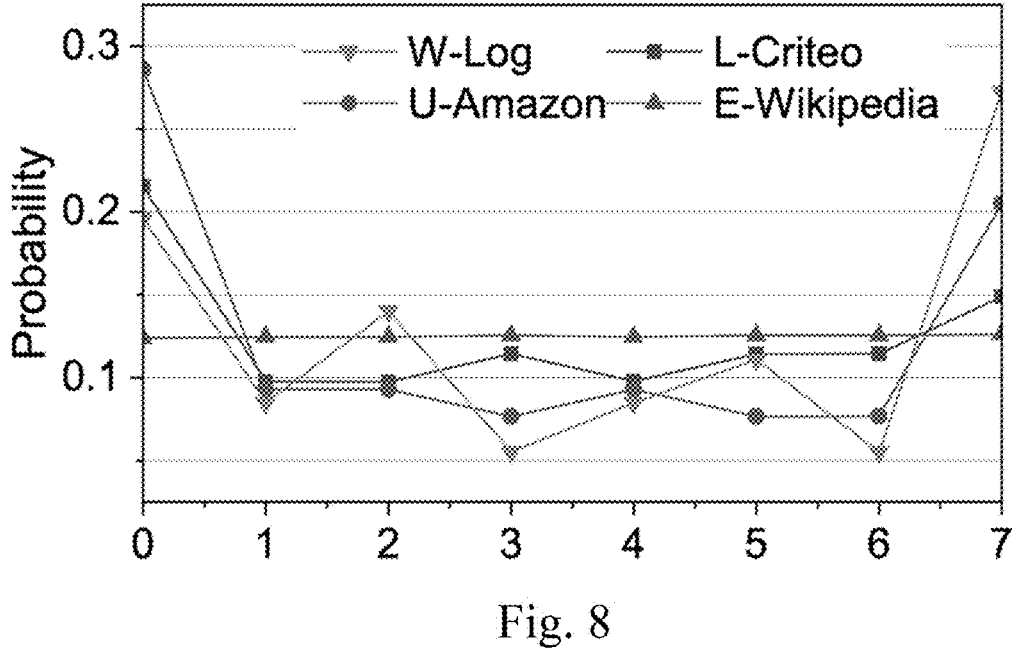
FIG. 8 shows the distribution of 8 characters and one workload in each shape is presented.

First, the data characteristics of workloads are analyzed to show the potential of data coding strategies. Today's 3D NAND flash memories apply one-pass programming to write all three pages of TLC into a WL through a single programming operation [3, 29]. Therefore, the data characteristics in the granularity of a WL are studied, as they are programmed at the same time. The distribution of voltage states of flash cells in each WL is collected. Each WL contains a large number of flash cells, for example, 16×1024×8 cells for the flash chips used in an example whose page size is 16 KB. Each cell is programmed into one of the 8 voltage states $S_i$, to store three data bits. For a simple illustration, decimal characters [7, 6, 4, 0, 2, 3, 1, 5] are used to represent the voltage states, by converting the three bits into decimals. 20 workloads are collected from different scenarios and they could be divided into four groups based on the distribution of data characters. The first three groups are named W-, L-, and U-shaped distributions based on the line shape of the probability distribution shown in FIG. 8. The fourth group is the Even (E) distribution, and from each group one distribution is selected and presented in FIG. 8.

Figure 9A:
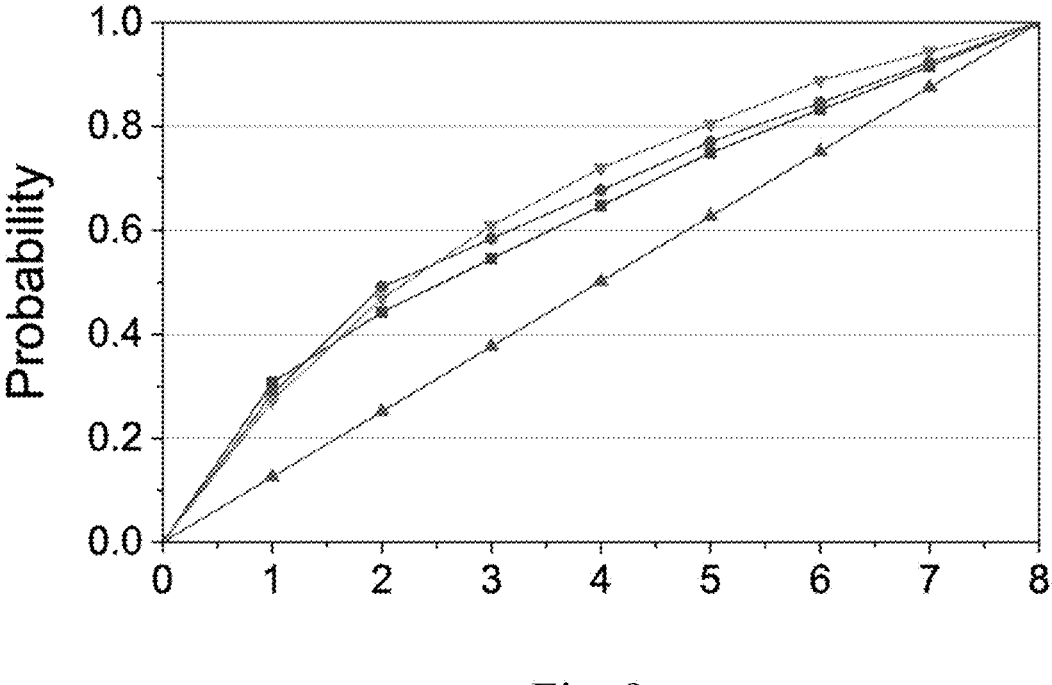
FIG. 9a shows the CDF (cumulative distribution function) of combined characters in the 1-cell case.
Figures 9B, 9C:
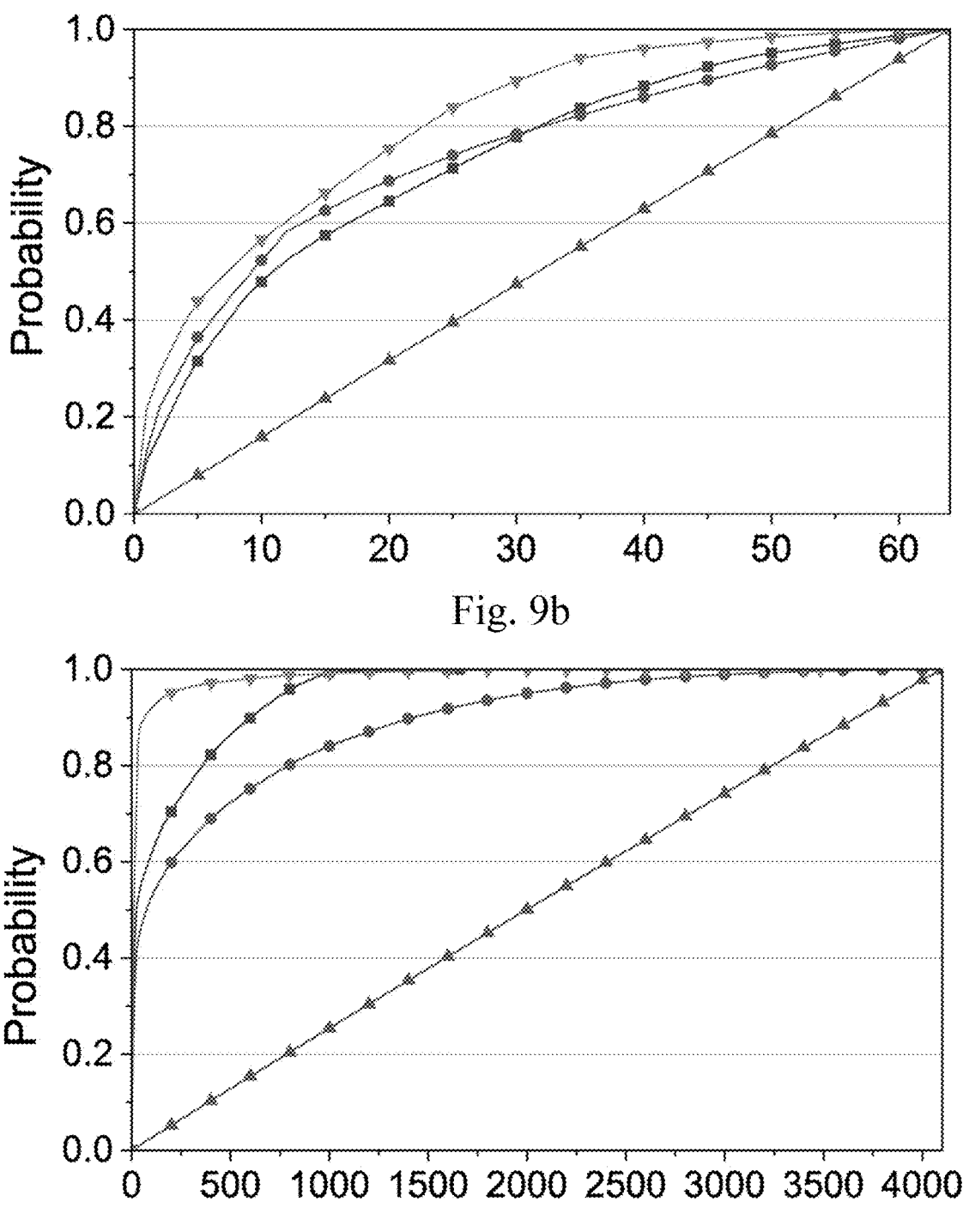
FIG. 9b shows the CDF (cumulative distribution function) of combined characters in the 2-cell case.
FIG. 9c shows the CDF (cumulative distribution function) of combined characters in the 4-cell case.

Next, it is shown that the combination of consecutive cells exhibits skewed properties. One cell or the combination of several consecutive flash cells are considered as a single entity to study the original data distribution of each WL. There are three settings in this study. For 1-cell, each flash cell is an entity. How many flash cells are in each of the eight voltage states in a WL is counted, which can be regarded as eight characters. For 2-cell, the combination of voltage state values from 2 consecutive cells is counted, (i.e., the combination of 2 characters), and the first number is two. There are 64 different combined state values (64 combined characters), since each cell could be one of the eight states. Similarly, 4-cell case has a total of 4096 different combined state values (4096 combined characters). The counts of the (combined) characters are sorted in descending order and converted into ratios. FIGS. 9a-9c show the CDF of the combined characters. The X-axis represents the sorted index of combined characters based on the frequency. 1 in the X-axis represents the index of the most frequent combined character.

In the even-distributed workload, all the CDFs in the three figures are linear functions. For the other three types of workloads, the CDF of the 1-cell case is near a linear function, which means that flash cells in each WL tend to have an even distribution over 8 voltage states. Therefore, it is hard to construct some skewed data patterns by merely mapping the desired voltage state to the most frequent state of flash cells. Some existing approaches propose to map the most frequent states to the lowest voltage state. Those strategies would not work well in this case, which could achieve 28.6% of the destination state at most. It should also be noticed that mapping to low voltage states does not introduce benefits for today's high-density 3D NAND flash memories, as presented above.

For these consecutive-cell cases of L-, W- and U-shaped workloads, the CDFs of 2-cell and 4-cell are convex lines. The top 12.5% combined characters take up 46.2% and 48.3% among all characters for 2-cell and 4-cell, respectively. Therefore, the combination of consecutive cells results in some skewed properties, which presents the potential for constructing the skewed data patterns presented previously.

Based on the above analysis, firstly skewed data patterns are constructed for data in three not-even groups. Here the goal is to construct skewed data patterns dominated by certain 2 voltage states for TLC NAND flash memories, as the characterization previously shows two DS data patterns have high reliability. Similarly, the coding is applicable to higher-density flash memories, like QLC with 4 bits per cell and PLC with 5 bits per cell.

Previous characterization shows that there are 2 DS data patterns (PS3+S4, PS3+S5) that present low RBER in the evaluated flash chip. The data patterns friendly to different flash chips could be different. For generalization consideration, $S_a$ and $S_b$ are to denote these two destination voltage states, whose combination forms the data pattern with low RBERs. The basic idea is to map the frequent combination of consecutive voltage states to the combination of $S_a$ and St, where $S_a$ and $S_b$ are the predetermined characters and the number of the predetermined characters is thus two. FIGS. 10a-10d show the illustration of the mapping, where 2-cell and 4-cell are presented. Consecutive 2 or 4 cells are regarded as a single entity for mapping.

Suppose that one wants to construct a data pattern dominated by S3 and S4, which corresponds to '000' and '010', i.e., 0 and 2. To introduce more 0 and 2, the combined characters that occur with high frequencies are mapped into the combinations of 0 and 2. The frequencies of all combinations of consecutive 2 or 4 characters are counted, and then the combinations are sorted by the frequencies descending order, represented as the numbers in black shown in FIGS. 10c and 10d. The combinations of characters will be mapped to the numbers in grey, which are set as constant patterns for a specific 3D NAND flash chip. For example, in the 2-cell mapping, '34' has the highest frequency, and it is mapped to '20'. At the same time, '20' in the original data if exists is mapped to '34' in the new coding. Similarly, suppose '3451' is the most frequent combination in the original data in 4-cell combination, and it will be mapped to '2020'. With this simple mapping strategy, the encoded data would contain a large percentage of the destination states, which in this example are represented by the predetermined characters of 2 and 0.

Figures 10A, 10B, 10C, 10D:
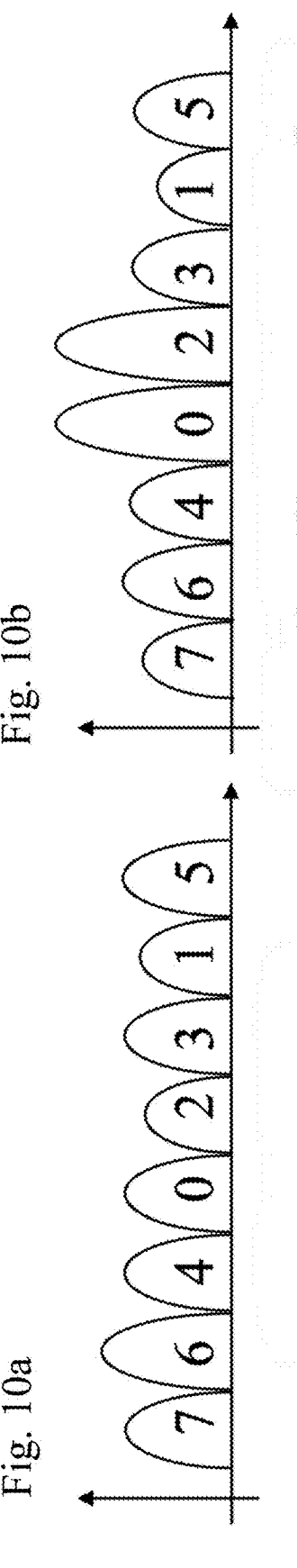
FIG. 10a shows the original distribution of characters in an example for illustrating skewed coding.
FIG. 10b shows the skewed distribution of characters in the example with massive "0" and "2".
FIG. 10c shows the mapping table of a 2-cell mapping in an example of skewed coding.
FIG. 10d shows the mapping table of a 4-cell mapping in an example of skewed coding.

In the case of 2-cell, the first number of characters in combination of all characters as shown in FIG. 10c is two. For the two preferred characters of "0" and "2", there are four possible combinations of them, i.e., 00, 02, 20, 22. Thus, while in FIG. 10c is shown that "20" is encoded from the most frequently combined characters of "34", the other three combinations of "2" and "0" are used for a second member of combinations of characters which are "51", "47" and "12". The second number is three, which equals to a square of the first number which is then subtracted by one.

Then, the size and the storage location of the mapping table are analyzed. For 2-cell mapping, there are 64 combinations, and each combination contains two characters (so the first number is two). Thus, 24 bytes are needed (64×6 bits/2=192 bits) to store the mapping, where each combination needs 6 bits. In the tested flash chip, the space for user data on a page is 16 KB, and the OOB area is 2 KB. The storage overhead of the mapping table for each WL (3 pages) is 0.05% (24B/48 KB). All 24 bytes can be stored in the OOB area of each WL. OOB area is usually used to store the ECC parity and the address mapping from the physical page address to the logical page address. Based on the evaluation, it is found that the 2 KB OOB area always has remaining space that is not used. Note that the numbers in grey are constant for a flash chip, and there is no need to store them for each WL.

For 4-cell mapping, there are 4096 combinations, and each combination needs 12 bits. There is no need to construct and store the full 4096 mapping for two reasons. First, the storage overhead of full mapping is high, which is 3 KB for each WL. Second, not all 4096 combinations would occur in the data of a WL (the size is 48 KB). As shown in FIGS. 9a-9c the top 32 characters take up 42.9% of all the possible characters. Therefore, only the first 32 combinations are mapped, which could already construct a data pattern dominated by '0' and '2'. The combined states that are not stored for mapping would stay in their original codes. In this case, the mapping table size is 48 bytes, which is 0.1% of the WL size. In the experiments, the default setting for the mapping size of 4-cell coding is also set as 48 bytes.

On the other hand, for E-shaped data, a reversed Huffman coding mechanism is used as a second data coding scheme to transform evenly distributed data into patterns with preferred characters. The preferred characters are predetermined before applying the coding schemes. Based on the same generalization above (i.e., $S_a$ and $S_b$), the basic idea is to code the combinations without or with few $S_a$ and $S_b$ to newly constructed combinations. Those new combinations are constructed by appending $S_a$ or $S_b$ to the end of the existing combination of $S_a$ and $S_b$. Therefore, this coding makes a tradeoff between the space (the coded data length) and data reliability (represented by the ratio of preferred characters).

Figure 11:
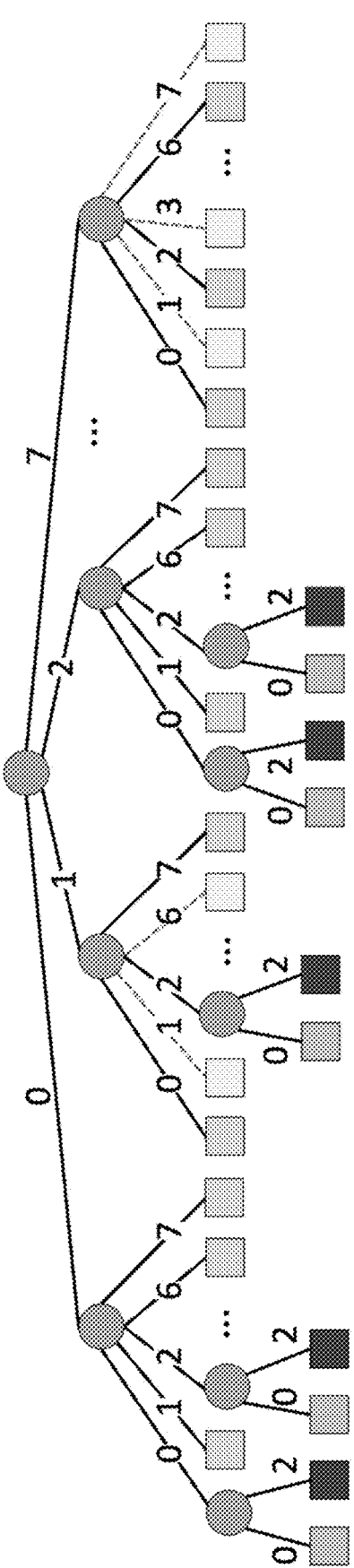
FIG. 11 is an illustration of a reversed Huffman coding according to an embodiment of the invention.

FIG. 11 shows a reversed Huffman coding mechanism according to one embodiment of the invention, where two consecutive cells are combined as an entity for coding, i.e., 2-cell mapping. The original uniform-length (i.e., 2) characters are encoded into variable lengths, which increases the frequencies of preferred characters, e.g., '0' and '2' in this example, at the cost of increasing coded data length. In particular, suppose that one aims to construct data patterns dominated by S3 and S4 (i.e., '0' and '2' as preferred characters). In the E-shaped data, each combined character has the same length (i.e., 2 cells) and a similar frequency. To increase the frequency of preferred characters, a pair of combined characters is grouped first, where one of the combinations has no or few preferred characters (i.e., '77') and the other of the combinations has lots of preferred characters (i.e., '00'). Then, the original combinations are encoded into new combinations constructed by appending a preferred character, i.e., encoding '77' to '002' and '00' to '000'. With this simple coding, there are more preferred characters, at the cost of increasing the total length of the coded data.

The choice of the combination without or with few preferred characters is based on the product of the number of preferred characters in the combination and the frequency. For E-shaped data, since the frequency of each combination is similar, only the number of preferred characters is considered, and there is no preference for combinations with the same number of preferred characters. For example, choosing '76' and choosing '77' in FIG. 11 would introduce the same result.

For 2-cell mapping, it is noted that there are only 4 combinations with two preferred characters in a combination. Coding combinations only from them results in a limited increase in the ratio of preferred characters. The coding mechanism then groups the pairs with the combination including one preferred character. An example of such a pair is '13' and '12', where '13' is coded to '120' and '12' is coded to '122'. For each such pair, the sum ratio of '0' and '2' is increased by about 1.25%, and the total length is increased by about 1.56%.

TABLE 1

The achievable benefits (sum ratio of preferred characters, e.g., '0' and '2') and overheads of reversed Huffman coding.

| | | | 2-cell mapping | | | | |
|---|---|---|---|---|---|---|---|
| Number of Pairs | 0 | 4 | 8 | 16 | 20 | 24 | 28 |
| Ratio of 0 & 2 (%) | 25 | 35.29 | 41.67 | 52.50 | 57.14 | 61.36 | 65.22 |
| Overhead (%) | 0 | 6.25 | 12.5 | 25 | 31.25 | 37.5 | 43.75 |
| | | | 4-cell mapping | | | | |
| Number of Pairs | 0 | 16 | 300 | 600 | 792 | 900 | 1056 |
| Ratio of 0 & 2 (%) | 25 | 25.54 | 32.50 | 38.22 | 41.96 | 43.55 | 46.46 |
| Overhead (%) | 0 | 0.20 | 3.66 | 7.32 | 9.86 | 10.99 | 13.09 |

Table 1 shows the achievable ratios of preferred characters, e.g., '0' and '2', and the space overheads with different numbers of pairs for mapping. The benefits are relatively limited with noticeable overheads, when two cells are combined. To exploit a better tradeoff between benefits and overheads, the above design principle is applied to the four-cell combination. For example, by grouping the pair of '7777' to '0000', '7777' is mapped to '00002', and the original '0000' is mapped to '00000'. In this case, the achievable ratios of '0' and '2' and the space overheads are shown in Table 1. With the four-cell mapping, the achievable ratio of preferred characters is in-creased from the original 25% to 41.96%, with 9.86% space overhead, highlighted in shades in Table 1.

Figure 12:
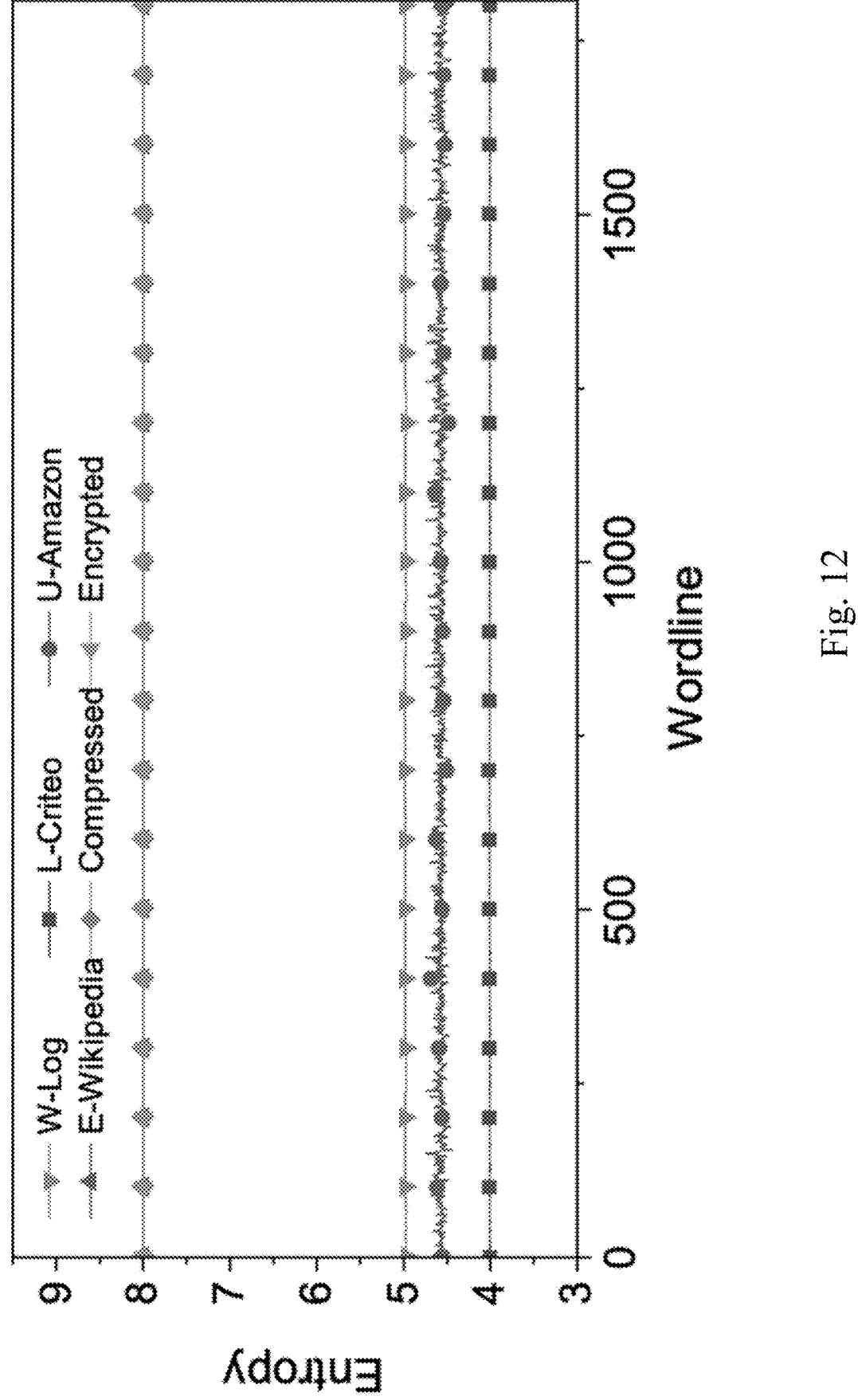
FIG. 12 shows the data entropy in the granularity of WLs. The lines of E shaped Wikipedia, Compressed, and Encrypted are overlapped.

The coding procedures of the method in FIG. 7 is now described. Before the actual coding process, a coding strategy will be selected based on the data entropy. FIG. 12 shows the data entropy in the granularity of WLs. The data entropy is distinctly separated into high or low values, which are divided by a predetermined threshold that can selected for example based on anticipated source data type. The original plain files, such as text and image files, usually have low entropy values, and each file has a distinct entropy value over all WLs. The E-shaped Wikipedia, and compressed or encrypted files, presented as Compressed and Encrypted in FIG. 12, often have high entropy, very close to the largest possible entropy value 8. Therefore, one can select the coding by quickly estimating the data entropy. By converting the entropy calculation into integer operations with the help of a small log lookup table, the calculation overhead is in sub-microsecond levels [15]. After the selection, the following illustrates the writing procedure for the two coding mechanisms.

Procedure of skewed coding is now described. In this mechanism, one need to count the frequency of combined characters of the original data. The combinations of characters all contain the same number of characters, which is a first number of characters. It is found that the data grouped by the granularity of WLs in the same file have a similar distribution of combined characters. Therefore, one only need to calculate the frequency of combined characters for the first write request of the file and the subsequent data writes can use the same mapping table obtained from the first write. The time overhead of calculating frequency is in the microsecond level, which is only performed at the first WL writing for each file. Writing a WL in TLC NAND flash takes 1500-5000 µs. The calculating frequency overhead is trivial compared to the write latency. Though all WLs that store data from the same file share one mapping table, the mapping table is still stored in each WL, to facilitate the decoding of each WL. Finally, with the mapping table, the data will be encoded in the same way as the randomizer, which transforms the characters sequentially. The process requires no storage overhead in the firmware since the existing randomizer already provides a similar function.

Procedure of reversed Huffman coding is now described. In this mechanism, a mapping table for all files is pre-defined, as the characters or combined characters all have an even distribution. In the encoding process, characters will be transformed according to the pre-defined mapping, in the same way as the randomizer in current flash controllers. If the data have an ideally even distribution over combined data, the overhead should be constant with the same mapping table, which is calculated in Table 1. But in real cases, the distribution is not ideally even, which causes a marginal increase in the space overhead. For simplicity, the overhead is set as a value that is slightly larger than the calculated one. In the experiments, a case is implemented that results in a sum ratio of '0' and '2' at 41.96%, with 9.86% overhead. The overhead is reserved as 10%, and numerous sets of experiments show that no WL introduces overheads exceeding 10%. Similarly, in the implementation with the ratio 46.46%, it is reserved that the overhead from 13.09% to 13.2%. For all the evaluated files, such over-head reservations are enough for randomized data, including compressed and encrypted files.

Since the coding strategy shown in FIG. 7 is a double-edged sword to the SSD lifetime, the logical capacity is used to quantify the impacts. On one hand, the reversed Huffman coding strategy introduces space overhead, which consumes space for user data. On the other hand, the RBER is reduced, which means the same physical drive can endure a larger number of P/E cycles, and the refresh frequency is reduced. The lifetime of NAND flash, represented as logical written capacity, can be calculated as the following equation.

$$\text{lifetime} = \frac{PE \times (1 + OP)}{365 \times DWPD \times WA} \quad (1)$$

Wherein OP, WA, DWPD, and PE are the over-provision factor, write amplification factor, the volume of data written per day, and the available P/E cycles of blocks, respectively.

For the skewed coding, the mapping table occupies some space of ECC parity, i.e., 48B in each WL. In the evaluated flash chips, one WL contains 24 ECC codewords, and one codeword consists of 2 KB user data and 224B parity. Thus, each codeword loses 2B parity space, and the ECC capacity is reduced by less than 3%. Due to the reduction of ECC capacity, WA should be increased because the data refresh frequency would increase. However, because the skew-encoded data have much lower RBER, which surpasses the ECC capacity loss, the refresh frequency is largely reduced, while the ECC capacity is only slightly shortened.

In the reversed Huffman coding, the ECC capability is maintained, but the space overhead is increased. The lifetime equation should be revised as follows.

$$\text{lifetime} = \frac{PE \times (1 + OP)}{365 \times DWPD \times WA \times (1 + OC)} \quad (2)$$

wherein CO is the overhead of the proposed reversed Huffman coding, which has two settings in this work (i.e., 10% and 13.2%). The experiments will show that although the coding imposes non-negligible overheads, the lifetime could be improved because of the write amplification reduction from less data refresh.

The above data coding strategies encode the data of a WL before programming, which also requires reading out all three pages in the WL for decoding. For small-granularity read requests, the performance would be impacted, as the latency increases from one page to one WL. The design is aimed to improve the reliability of cold data, which has marginal impacts on performance. On one hand, cold data are rarely accessed and thus contribute little to the overall access performance. On the other hand, cold data tend to be accessed in a large granularity [38, 41]. For example, archived data and some datasets for artificial intelligence are usually not read. If a dataset is needed, all the data of the dataset might be read out. In this case, the proposed method introduces no additional read overhead, as all pages in the WL are required.

Next, an experimental setup for evaluating effectiveness of the method shown in FIG. 7 will be described. The method is evaluated on the YEESTOR 9081 and 9086 SSD evaluation platform [39]. The evaluated flash chips in this section are from Micron, which have 176 layers. The page size is 16 KB for user data plus 2 KB of OOB space. The number of P/E cycles is set as 1000, and flash chips are baked with high temperatures at 100° C. for simulating long retention time [21, 22, 24].

The following strategies are evaluated on 3D flash chips.
Rand: Data is randomized before programming, which is the representative strategy in most 3D flash devices.
Origin: The original raw data of workloads without coding.
Skewed-2C: The 2-cell coding strategy regarding consecutive 2 cells as an entity, to construct data dominated by '0' and '2'. This setting is because the data pattern dominated by S3 (000, i.e., 0) and S4 (010, i.e., 2) has very low RBER in the tested flash chip.
Skewed-4C: The 4-cell coding strategy regarding consecutive 4 cells as an entity, to construct data dominated by '0' and '2'.
ReHuff-10: The reversed Huffman coding strategy with 9.86% overhead, to construct data dominated by '0' and '2'. ReHuff-10 reserves 10% overhead to cover corner cases.
ReHuff-13: The reversed Huffman coding strategy with 13.09% overhead, to construct data dominated by '0' and '2'. ReHuff-13 reserves 13.2% overhead to cover corner cases.

The reliability enhancement is evaluated on six open workloads: W shaped Log [19], L shaped Sound and Criteo

[5], U shaped Amazon [6] and NeuralPS [7], and E shaped Wikipedia [8]. The skewed coding is evaluated on the first five workloads. The reversed Huffman coding is evaluated on E shaped Wikipedia. For reversed Huffman coding, two files are also generated by compressing and encrypting Amazon, respectively, presented as Compressed and Encrypted.

Figure 13A:
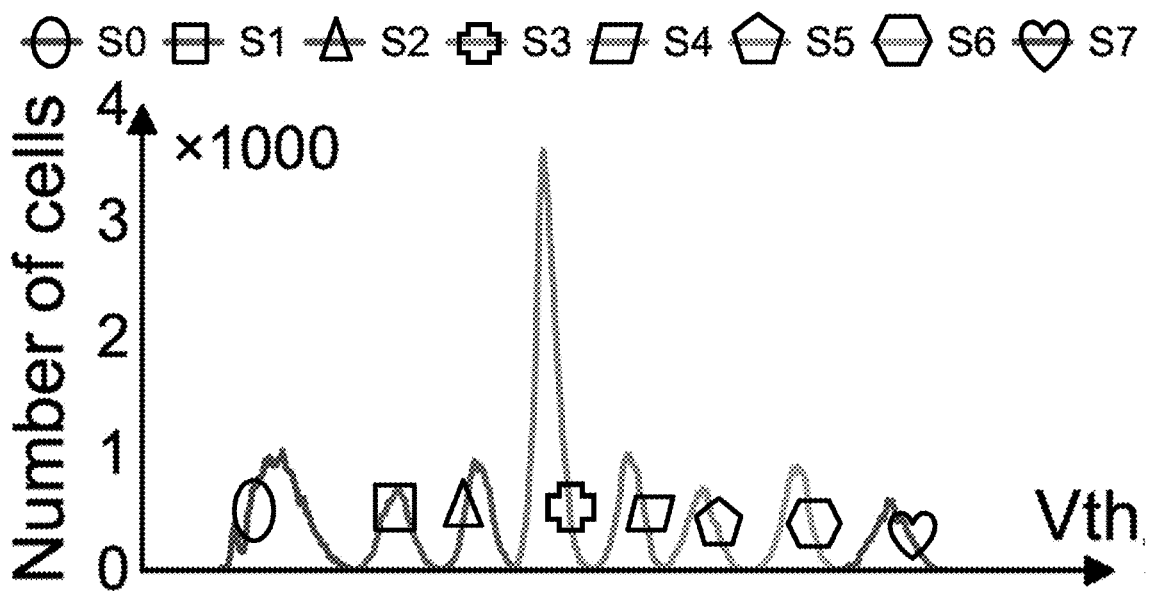
FIG. 13a shows the $V_{th}$ distribution of an original data in an example (Amazon).
Figure 13B:
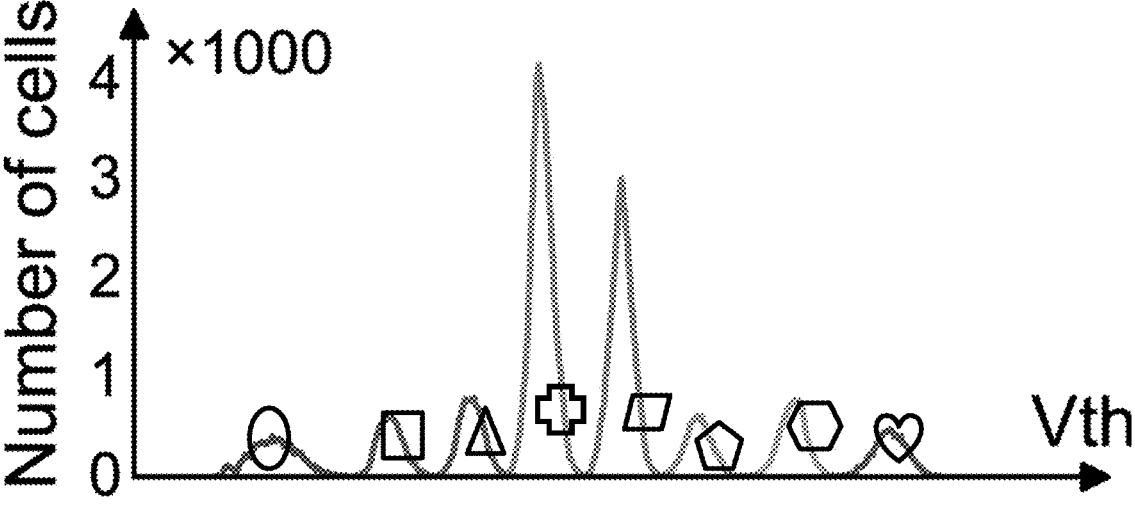
Figure 13C:
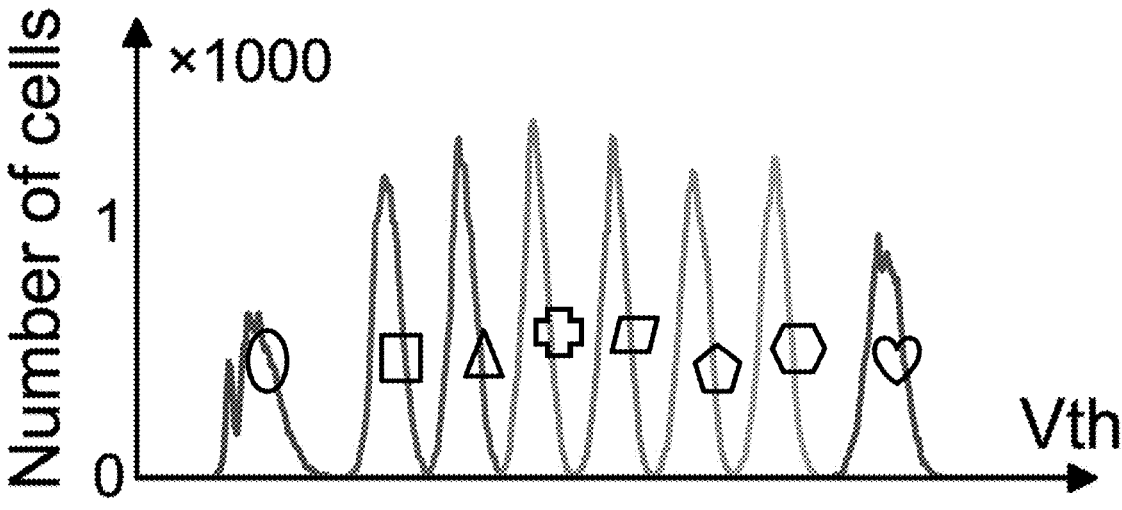
FIG. 13c shows the $V_{th}$ distribution of an original data in an example (Wikipedia).
Figure 13D:
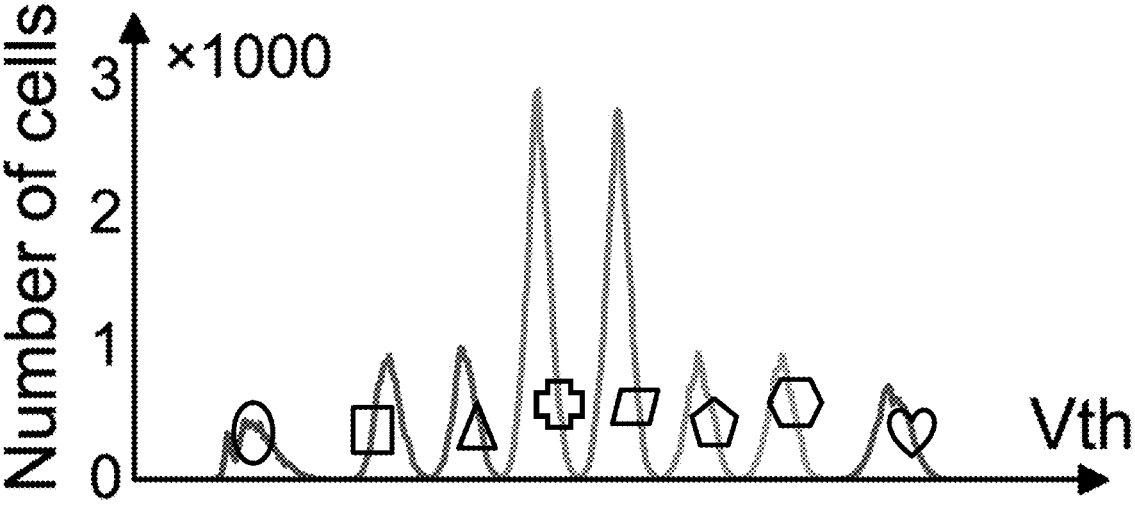
FIG. 13d shows the $V_{th}$ distribution of encoded data using skewed coding based on the original data in FIG. 13c.

Next, the state distribution before and after coding, the RBER reduction, and the lifetime improvement will be discussed for the experimental results. Firstly, the state distribution of two workloads is presented, one from the uneven distributions and one from even distributions, as shown in FIGS. 13*a*-13*d*. In this example, the destination voltage states are S3 and S4, that is to construct PS3+S4 with lots of '0' and '2'. The original distribution in Amazon looks like data pattern PS0+S3 introduced in previously, with lots of cells in voltage states S0 and S3, shown in FIG. 12*c*. The skewed coding strategy successfully encodes the data to the data pattern dominated by '0' and '2'. With the reversed Huffman coding, the even distribution of Wikipedia in FIG. 13*c* is changed to the desired data patterns.

Figure 14:
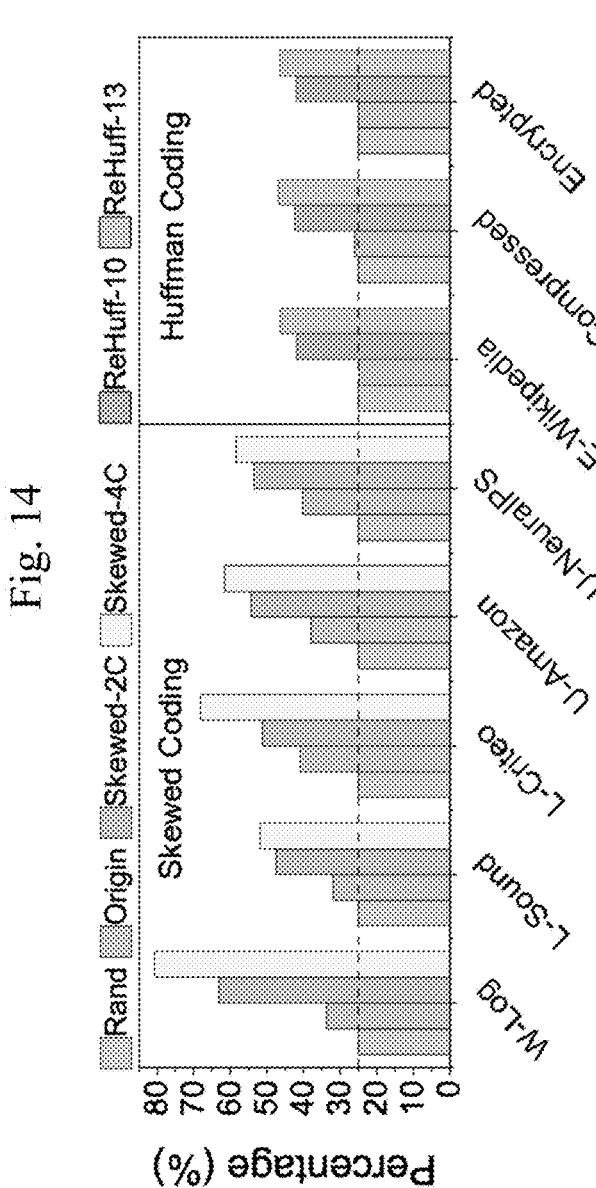
FIG. 14 depicts the ratio of S3 and S4. The dashed line points to 25%, which marks the sum ratio of randomized data. The bars in each grouping correspond to, from left to right: Rand, Origin, Skewed-2C and Skewed-4C for Skewed Coding, respectively; and Rand, Origin, ReHuff-10 and ReHuff-13, respectively.

Improvement in the ratio of preferred characters: FIG. 14 further shows the sum percentage of 0 and 2 to quantitatively estimate the effectiveness of the proposed coding strategies. With randomization, each state takes about 12.5%, and the sum ratio of 0 and 2 is about 25%. In the original workloads, except Wikipedia, the sum ratio of 0 and 2 is 38%, on average. Skewed-2C and Skewed-4C could effectively increase the ratio to 54% and 58%, respectively. Recall that the ratio of the manually-constructed data pattern PS3+S4 is 62.5%, which has the lowest RBER among all the manually-constructed patterns. Our method achieves a similar ratio to PS3+S4, and it will be presented that the encoded data have a similar reliability to PS3+S4. In the case of even distribution, including Wikipedia, the compressed and encrypted data, the sum ratio of 0 and 2 in the original data is around 25%, which is very similar to that of randomized data. After the reversed Huffman coding, the ratios are about 42% and 47%, respectively. It is worthy noting that these values are very close to the values that are calculated in Table 1. This is because the data being sliced into the granularity of WLs also have nearly identical even distributions.

Figure 15:
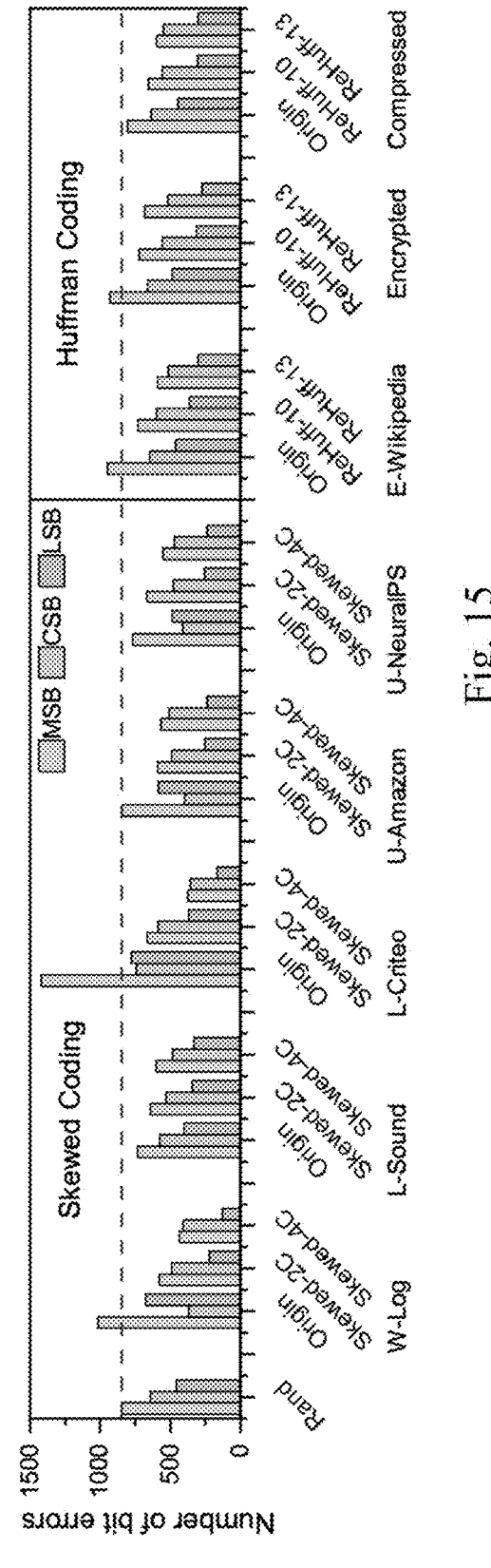
FIG. 15 depicts the page RBER comparison among different strategies. The bars in each grouping correspond to, from left to right: MSB, CSB and LSB, respectively.

FIG. 15 shows the RBER comparison. The data is collected after baking at 100° C. for 4 hours, which is the average value of all wordlines in a flash block. Note that Rand has the same performance under different workloads, and only one set of results from Rand is presented. The left part in FIG. 15 evaluates the RBER reduction of the skewed coding. Because workloads have different distributions in their original data, Origin of different workloads might have worse or better reliability than Rand. Nevertheless, the proposed skewed coding could significantly reduce the number of bit errors, compared to Origin and Rand. Compared to Origin, Skewed-2C and Skewed-4C could averagely reduce the number of bit errors in the MSB page by 30% and 42%, respectively. The right part in FIG. 15 evaluates the RBER reduction of the reversed Huffman coding. Origin has similar reliability as Rand because of the near-even distribution. The reversed Huffman coding with 10% and 13% overhead averagely reduces the number of bit errors in the MSB page by 21% and 30%, respectively.

Figures 16A, 16B:
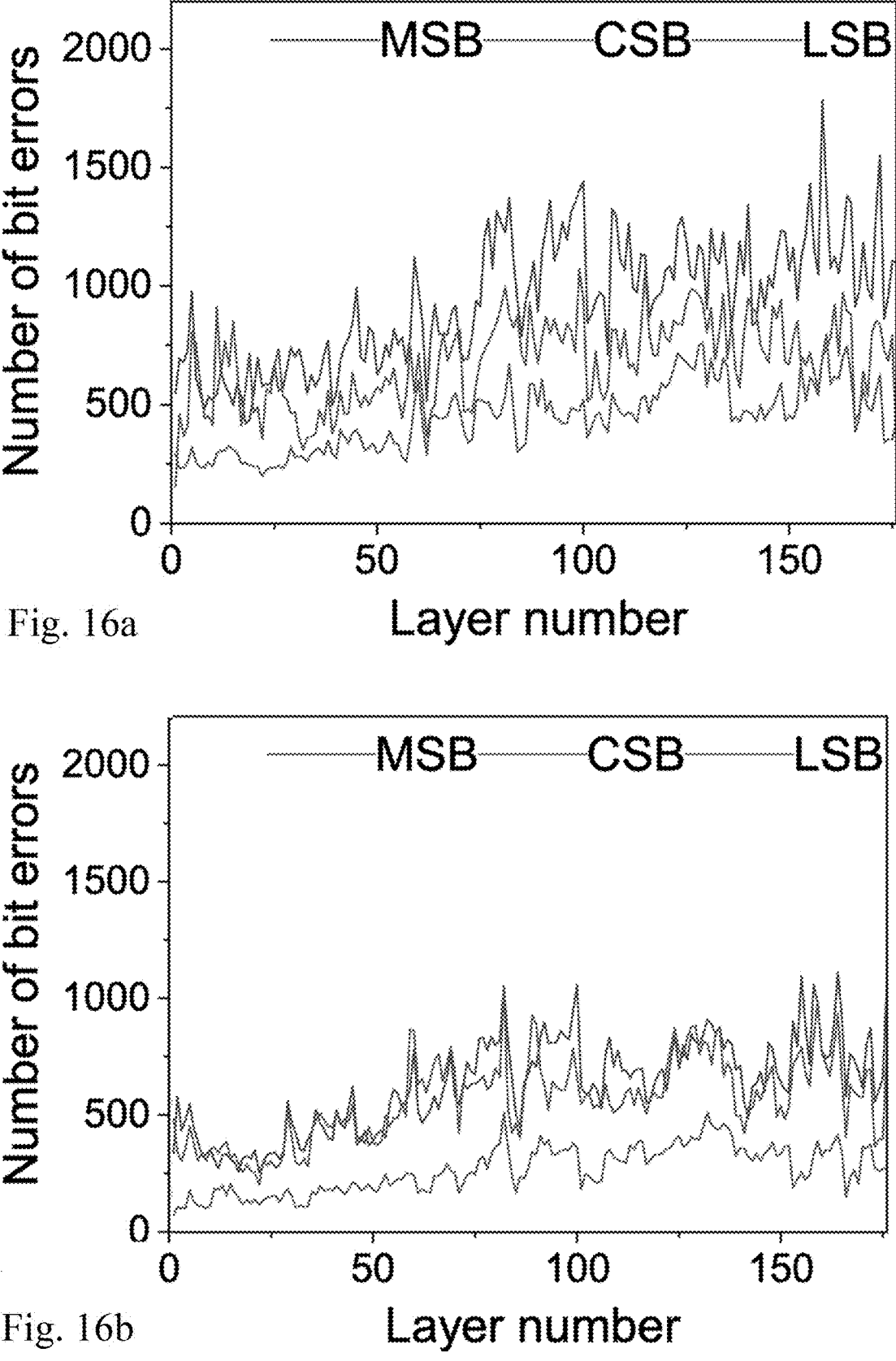
Figure 16C:
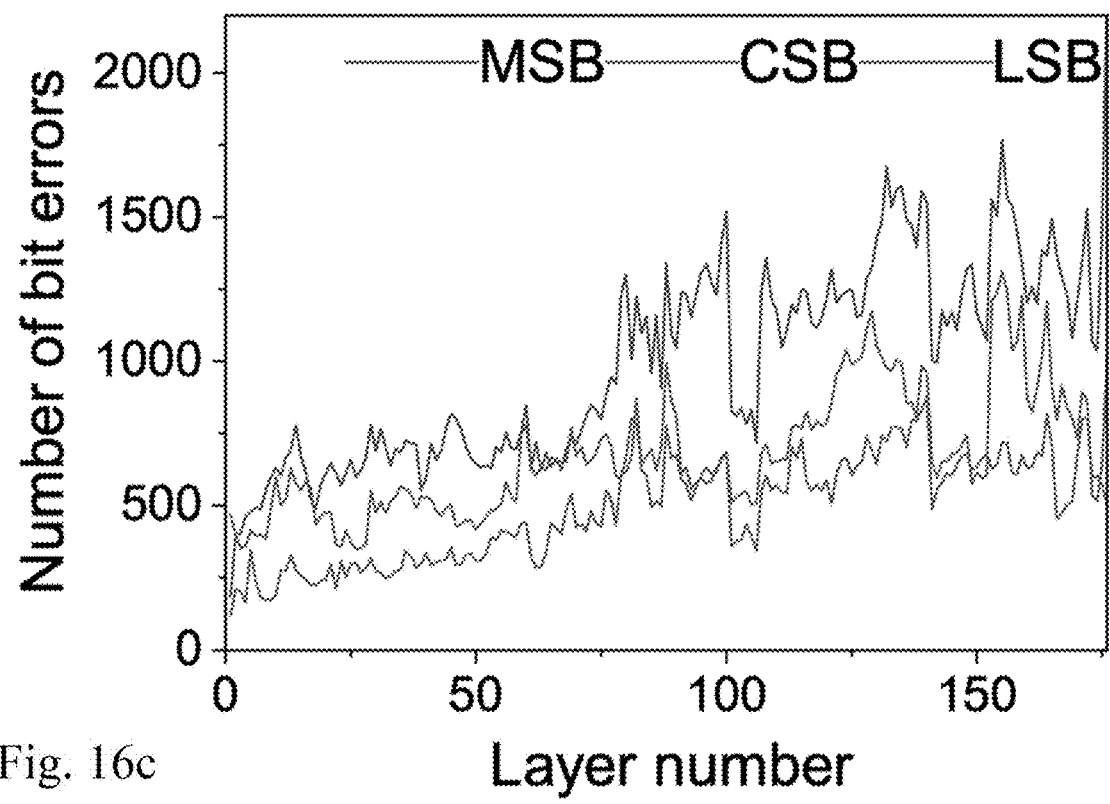
FIG. 16c shows the number of bit errors at different layers of an original data in an example (Wikipedia).
Figure 16D:
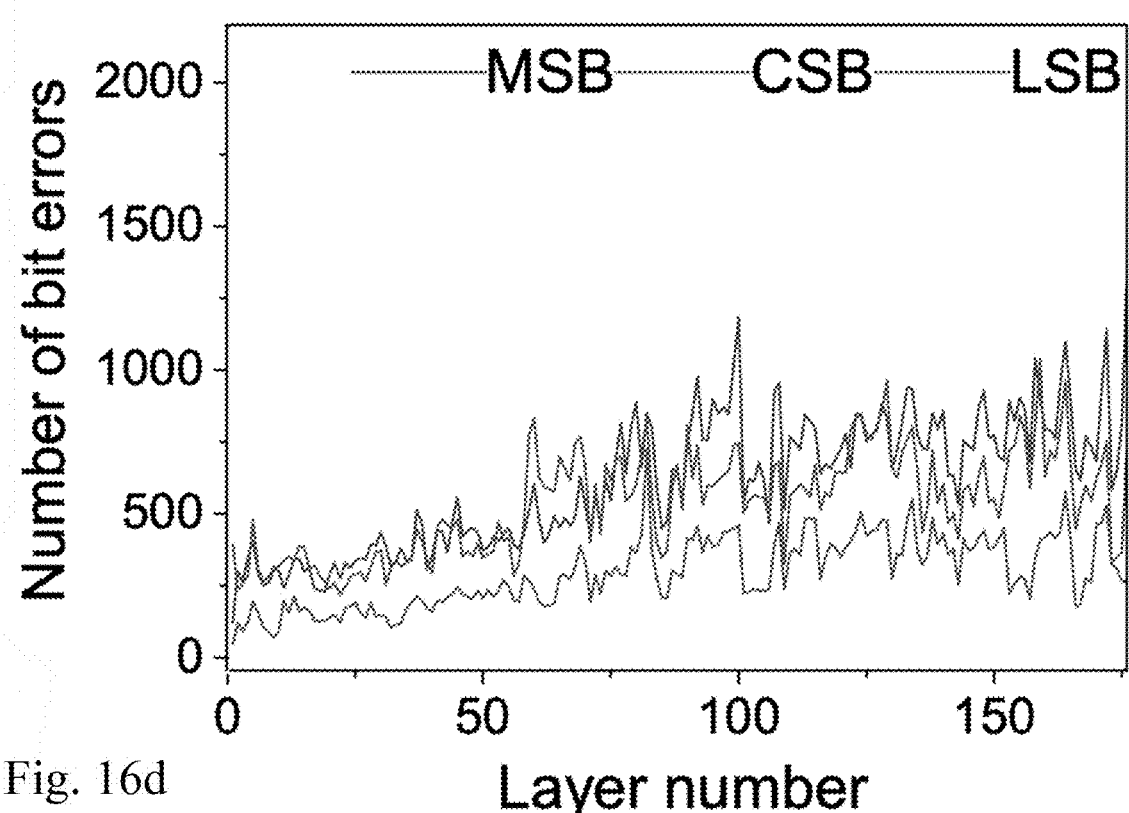
FIG. 16d shows the number of bit errors at different layers using reversed Huffman coding based on the original data in FIG. 16c.

The above data shows the reduction of the average number of bit errors. Then, the page RBER in each layer of flash blocks is presented, shown in FIG. 15. Because of the layer-to-layer variations in 3D NAND flash [13], the RBER difference could exceed one order of magnitude in Origin. For example, the MSB page of wordline 1256 has 1784 bit errors, compared to 80 bit errors on the LSB page of wordline 6, in FIG. 16*a*. Such variations are well relieved by the proposed coding strategies. Both the variation among wordlines and the variation among three types of pages are significantly reduced after encoding with the proposed two mechanisms.

Figure 17A:
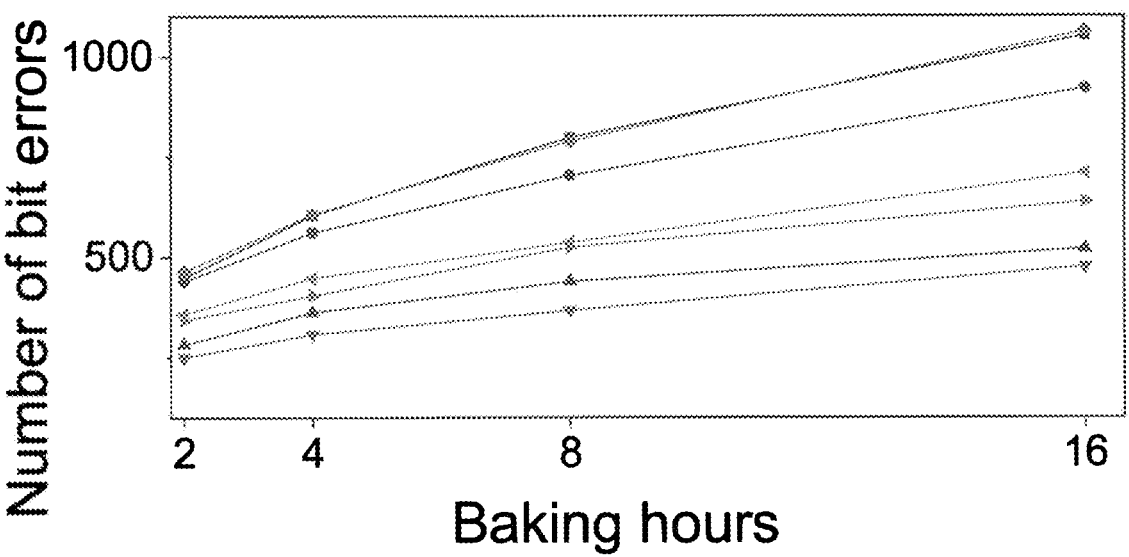
FIGS. 17a-17c show the increase of the page RBER over baking hours at LSB page, CSB page, and MSB page respectively, when reading with the optimal read voltages.
Figure 17B:
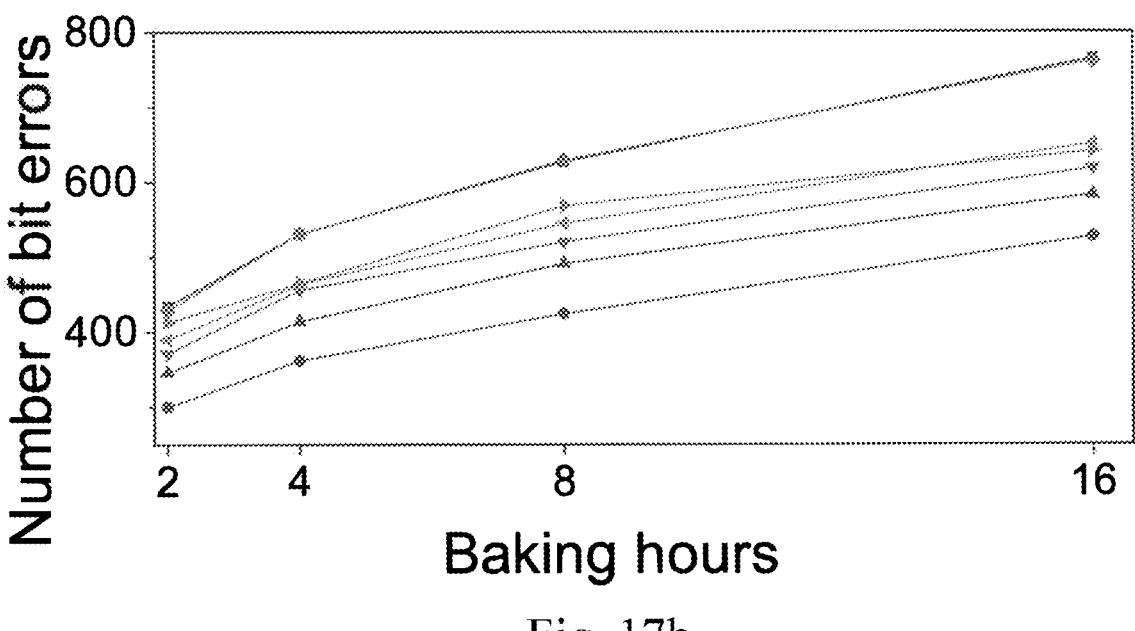
Figure 17C:
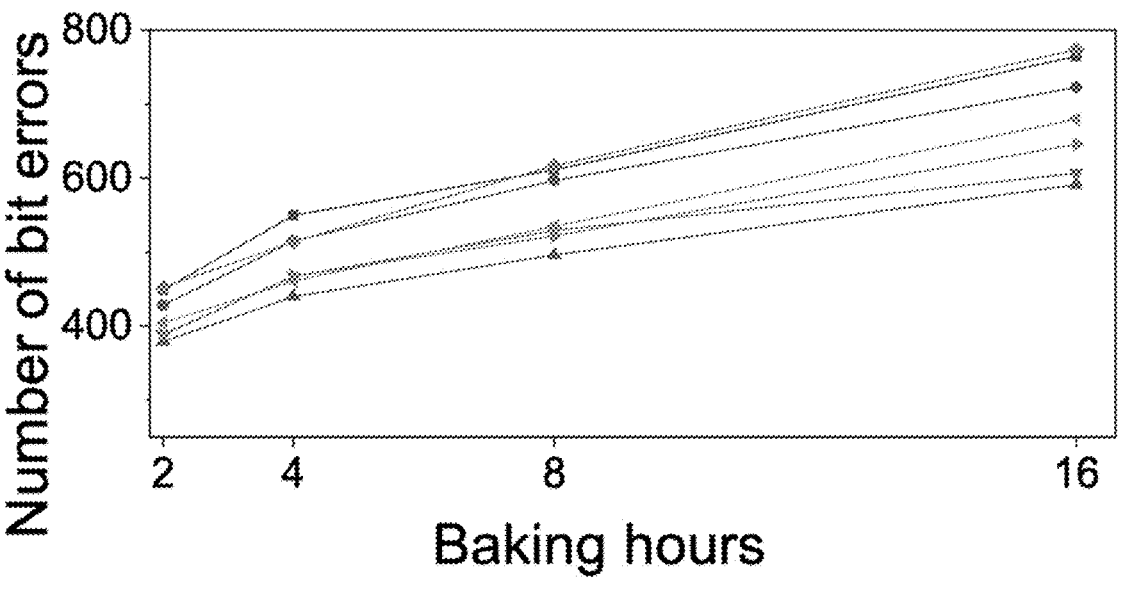
Figure 17D:
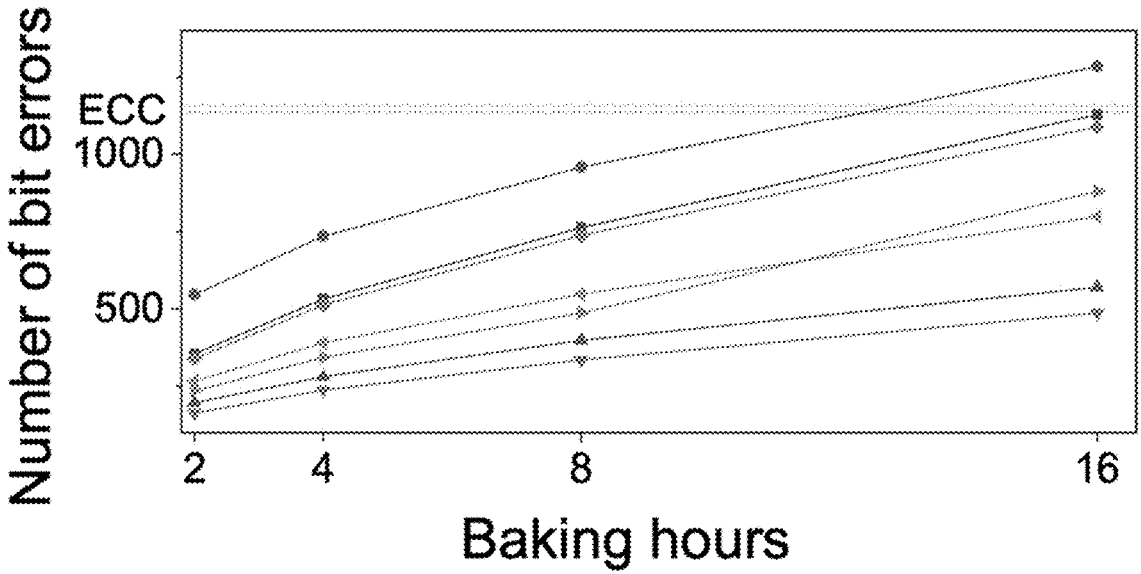
FIGS. 17d-17f show the increase of the page RBER over baking hours at LSB page, CSB page, and MSB page respectively, when reading with the default read voltages.
Figure 17E:
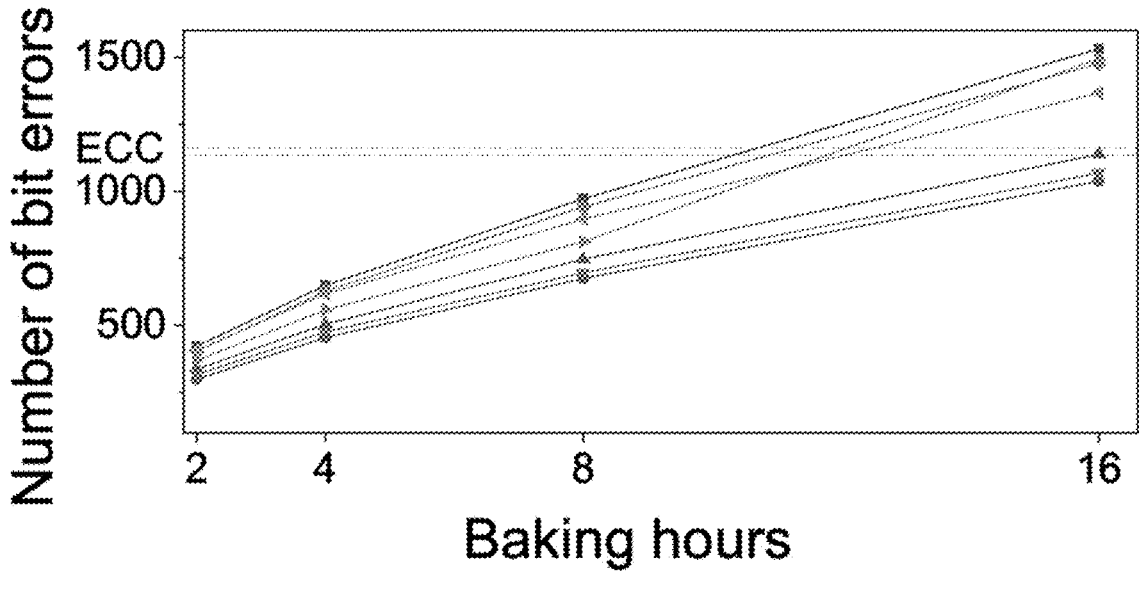
Figure 17F:
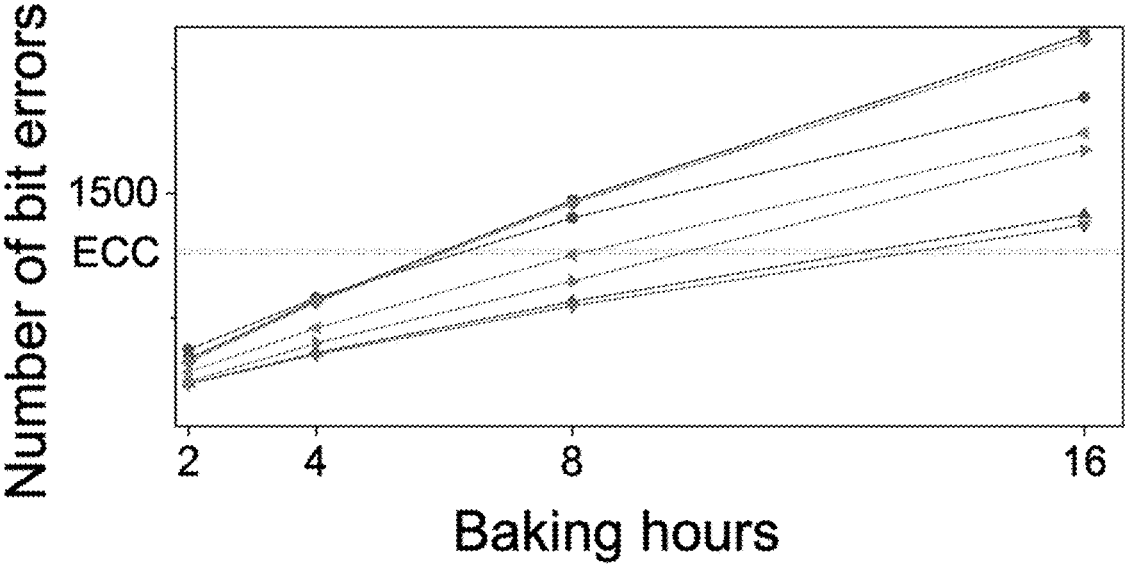

Then, the lifetime improvement of the proposed strategies is presented. As presented in previously, the lifetime, represented as the logical written capacity, can be improved because of the reduction in write amplification. In this work, the write amplification caused by data refresh is mainly considered for reliability guarantee [23, 17]. FIGS. 17*a*-17*f* show how the number of bit errors increases with the baking hours at 100 C. Each point in FIGS. 17*a*-17*c* is the max number of bit errors of all pages within a flash block, where the data is read with the optimal read voltages, that introduces the least number of bit errors [20, 28, 31]. When the bit errors at the optimal read reach the ECC capability (labeled as the red dashed lines), the data cannot be correctly decoded. The results show that the proposed coding strategies introduce lower RBER than Rand and Origin. This means the methods according to embodiments could be combined with the state-of-the-art voltage tuning approaches [20, 28, 31] for RBER reduction. Because the absolutely optimal values are hard to achieve in real cases, the average bit errors resulting from reading with the default read voltages is shown in FIGS. 17*d*-17*f*. When the average RBER reaches the ECC capability, many pages would suffer from heavy read retries, thus the controller performs data refresh for the block. Rand and Origin of Wikipedia performs the worst on the MSB page. The raw bit errors reach the ECC capability after baking for 8.35 hours on the MSB page, which is equivalent to 2.44 months at 40 C [2, 37]. Note 2.5 that the ECC capacity of Skewed-4C is slightly lower than the 2.0 original ECC capability due to the occupation of the mapping 1.5 table in OOB. Nevertheless, Skewed-4C could prolong the 1.0 refresh period to 5.58 months, which is 2.29 times of Rand.

Figure 18:
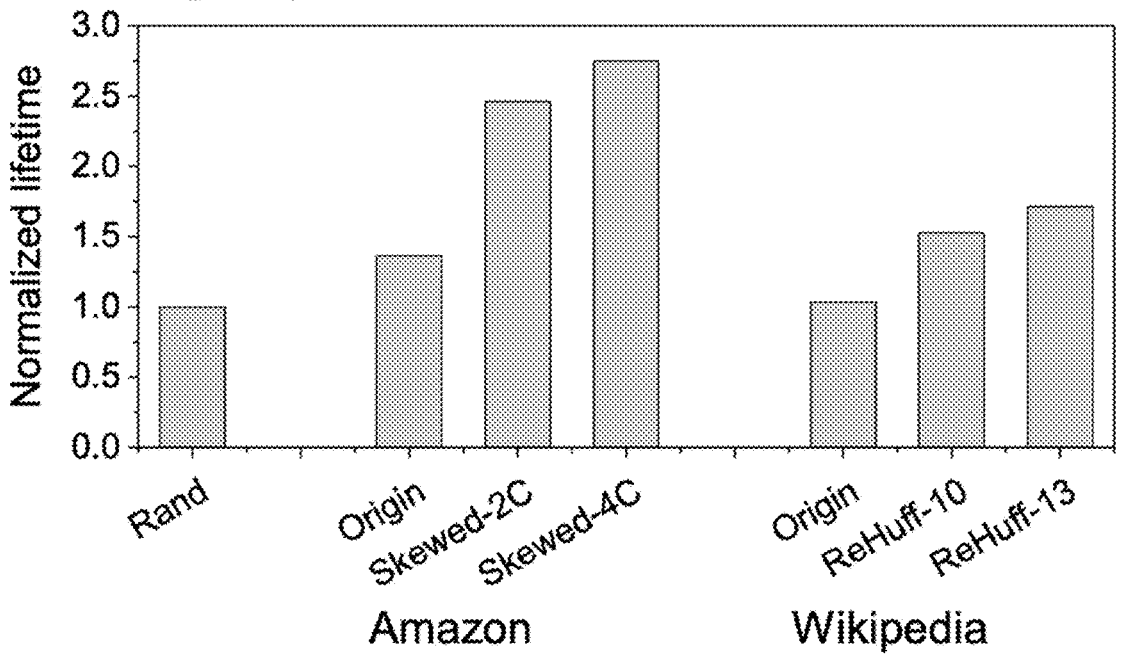
FIG. 18 shows lifetime improvement of the two source data with different types of proposed coding schemes.

Simulations are conducted on SimpleSSD [16, 44] to study the lifetime impacts. Refresh mechanisms are implemented to simulate the write amplification in real workloads and different coding strategies have different refresh frequencies discussed above. Finally, the write amplification data is transformed into lifetime, as shown in FIG. 18. Compared to Rand, the skewed coding and reversed Huffman coding prolong the lifetime by 2.8→ and 1.7→, respectively.

In summary, one can see that exemplary embodiments of the invention above adopt different encoding schemes based on the entropy value of the source data, allowing for the encoding of nearly all types of source data into ideal data patterns. In the skewed coding algorithm, a technique is employed where two merged characters or four merged characters are encoded together. In the reversed Huffman coding algorithm, the size of the mapping table is controlled to manage encoding costs and the number of target characters effectively.

By providing the two encoding schemes for cold data storage, it effectively enhance the reliability of data storage. Significant performance variations among different data patterns is realized, and a high-performance data pattern is selected for storage to extend the lifespan of storage devices. By dynamically choosing one of the encoding methods, including skewed coding and reversed Huffman coding, based on the calculated entropy of the data, the source data is encoded into specific data patterns before being programmed to NAND flash arrays. This innovative approach optimizes data reliability and storage efficiency, contributing to improved long-term data preservation and storage device longevity.

One of the main functions of certain embodiments disclosed hereing is to encode the source data for storage and then decode it for retrieval. It alters only the intermediate step of data storage by transforming it into a different data pattern, thereby enhancing data reliability. For long-term storage of cold data, it effectively addresses the issue of reduced reliability, ensuring data integrity over extended periods.

One of the main applications of certain embodiments disclosed herein is focused on cold data. For instance, it can be applied to datasets in the field of artificial intelligence that are infrequently accessed. When such a dataset is needed, it can be read in its entirety, eliminating the overhead associated with read. This application ensures that data can be efficiently and reliably stored for extended periods while minimizing access-related costs.

The application of the certain embodiments disclosed herein is in the field of data storage, where it finds utility in various industries and domains. Some potential applications include:

Data Archiving: In the industrial sector, there is often a need for the long-term retention of extensive datasets, including sensor data, production records, and monitoring data. These data sources may become inactive over time but may still require preservation for several decades, often driven by quality control requirements.

Healthcare: Healthcare institutions must maintain large volumes of patient records, medical images, and diagnostic data. Many of these datasets may become inactive in the short term but may necessitate extensive retrieval and analysis in the future.

Financial Services: Financial institutions have a substantial need for storing historical transaction data, customer records, and market data. Much of this data must be retained for extended periods post-transaction to meet compliance requirements.

These datasets are highly suitable for utilizing the data encoding scheme provided by certain embodiments disclosed herein, which transforms the data into a different pattern for storage. This approach effectively enhances the reliability of storing these datasets and extends the lifespan of the storage devices used for their preservation.

Compared to existing technologies, the main advantages of exemplary embodiments of certain embodiments disclosed herein are as follows:

Pattern-Based Storage Optimization: Exemplary embodiments of the invention recognize that different data patterns yield varying storage benefits and identifies specific data combinations suitable for efficient data storage. By encoding and changing the pattern of the source data, it achieves efficient storage and enhances data reliability.

Unique Approach: In contrast to existing technologies or products aimed at improving data reliability, this discovery offers a unique perspective to address the issue. It achieves excellent results by solely altering the data storage intermediate process pattern, all while maintaining cost-effectiveness.

Exemplary embodiments of the invention approach provide a fresh and effective solution for enhancing data reliability, making it a valuable contribution to the field of data storage and archiving.

The exemplary embodiments are thus fully described. Although the description referred to particular embodiments, it will be clear to one skilled in the art that certain embodiments disclosed herein may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

The functional units and modules of the systems and methods in accordance with the embodiments disclosed herein may be implemented using computing devices, computer processors, or electronic circuitries including but not limited to application-specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, and mobile computing devices such as smartphones and tablet computers.

The embodiments include computer storage media, transient and non-transient memory devices having computer instructions or software codes stored therein which can be used to program computers or microprocessors to perform any of the processes of the present disclosure. The storage media, transient and non-transitory computer-readable storage medium can include but are not limited to floppy disks, optical discs, Blu-ray Disc, DVD, CD-ROMs, magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in a distributed fashion by one or more processing devices interconnected by a communication network, such as an intranet, WAN, LAN, the Internet, and other forms of data transmission medium.

The invention claimed is:

1. A computer-implemented method for encoding data to be stored in a solid-state storage device, comprising the steps of:

a) providing a source data;

b) calculating an entropy of the source data;

c) applying a first encoding scheme to encode the source data into an encoded data, if the entropy is below a threshold; the first encoding scheme adapted to encode most frequently combined characters in the source data into predetermined characters to increase ratio of the predetermined characters in the encoded data; wherein the step of applying a first encoding scheme to encode the source data into an encoded data further comprises:

i. counting frequencies of all combinations of characters, wherein each said combination contains a first number of the characters;

ii. sorting the combinations according to their frequencies;

iii. identifying one said combination that has a highest frequency as the most frequently combined characters;

iv. determining a second number of said combinations, of which said frequencies immediately follow that of the most frequently combined characters; wherein the second number equals to or is smaller than a square of the first number minus one; and v. encoding the second number of said combinations and the most frequently combined characters into different combinations of the predetermined characters;

d) applying a second data encoding scheme to encode the source data into the encoded data, if the entropy is equal to or higher than the threshold; the second data encoding scheme adapted to encode evenly distributed combined characters into a plurality of patterns with the predetermined characters, in order to increase the ratio of the predetermined characters in the encoded data.

2. The computer-implemented data encoding method of claim 1, wherein the first number is two or four.

3. A computer-implemented data encoding method for encoding data to be stored in a solid-state storage device, comprising the steps of:

a) providing a source data;

b) calculating an entropy of the source data;

c) applying a first encoding scheme to encode the source data into an encoded data, if the entropy is below a threshold; the first encoding scheme adapted to encode most frequently combined characters in the source data into predetermined characters to increase ratio of the predetermined characters in the encoded data; wherein the step of applying a first encoding scheme to encode the source data into an encoded data further comprises:

i. counting frequencies of all combinations of characters, wherein each said combination contains a first number of the characters;

ii. sorting the combinations according to their frequencies;

iii. identifying one said combination that has a highest frequency as the most frequently combined characters;

iv. determining a second number of said combinations, of which said frequencies immediately follow that of the most frequently combined characters; and v. encoding the second number of said combinations and the most frequently combined characters into different combinations of the predetermined characters;

d) applying a second data encoding scheme to encode the source data into the encoded data, if the entropy is equal to or higher than the threshold; the second data encoding scheme adapted to encode evenly distributed combined characters into a plurality of patterns with said predetermined characters, in order to increase the ratio of the predetermined characters in the encoded data;

wherein Step v) is conducted based on a mapping table, the mapping table created upon a first write request into the solid-state storage drive.

4. The computer-implemented data encoding method of claim 3, wherein the mapping table is stored in an out-of-band (OOB) area of a page within a flash memory of the solid-state storage drive.

5. A computer-implemented data encoding method for encoding data to be stored in a solid-state storage device, comprising the steps of:

a) providing a source data;

b) calculating an entropy of the source data;

c) applying a first encoding scheme to encode the source data into an encoded data, if the entropy is below a threshold; the first encoding scheme adapted to encode most frequently combined characters in the source data into predetermined characters to increase ratio of the predetermined characters in the encoded data; and d) applying a second data encoding scheme to encode the source data into the encoded data, if the entropy is equal to or higher than the threshold; the second data encoding scheme adapted to encode evenly distributed combined characters into a plurality of patterns with the predetermined characters, in order to increase the ratio of the predetermined characters in the encoded data; wherein the step of applying the second data encoding scheme to encode the source data into the encoded data further comprises:

i) identifying a pair of combinations of characters including a first combination and a second combination, the first combination having more the predetermined characters than the second combination;

ii) encoding the first combination into a first one of the plurality of patterns; and iii) encoding the second combination into a second one of the plurality of patterns;

wherein the first combination and the second combination each contain a first number of the characters; the first and second ones of the plurality of patterns each containing a second number of the predetermined characters; the first number being smaller than the second number; and wherein a first number of most significant characters in the first one of the plurality of patterns are identical to a first number of most significant characters in the second one of the plurality of patterns.

6. The computer-implemented data encoding method of claim 5, wherein a difference between the first number and the second number is one.

7. The computer-implemented data encoding method of claim 4, wherein Step ii) and Step iii) are conducted based on a mapping table, the mapping table being pre-defined prior to Step d).

8. The computer-implemented data encoding method of claim 5, wherein the second combination contains none of the predetermined characters, and the first combination consists entirely of the predetermined characters.

9. The computer-implemented data encoding method of claim 1, wherein Step b) further comprises conducting integer operations on the source data based on a log lookup table.

10. The computer-implemented data encoding method of claim 1, wherein Step b) is performed by an embedded processor in a controller of the solid-state storage device.

11. The computer-implemented data encoding method of claim 1, wherein the predetermined characters represent voltage states in the solid-state storage device.

12. The computer-implemented data encoding method of claim 2, wherein a number of the predetermined characters is two.

13. The computer-implemented data encoding method of claim 1, wherein the first encoding scheme is skewed coding scheme, and the second encoding scheme is reversed Huffman coding.

14. A non-transitory computer-readable memory recording medium having computer instructions recorded thereon, the computer instructions, when executed on one or more processors, causing the one or more processors to perform operations according to the method according to claim 1.

15. A computing system comprising:

a) one or more processors; and b) memory containing instructions that, when executed by the one or more processors, cause the computing system to perform operations according to the method of claim 1.

16. The computing system of claim 15, further comprising a solid-state storage device controller; said one or more processors being one or more embedded processors in the solid-state storage device controller.

\*    \*    \*    \*    \*